US011327300B2

(12) United States Patent
Gross

(10) Patent No.: US 11,327,300 B2
(45) Date of Patent: May 10, 2022

(54) OPTICAL ABERRATION CONTROL FOR CAMERA

(71) Applicant: Apple Inc., Cupertino, CA (US)

(72) Inventor: Kevin A. Gross, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/019,052

(22) Filed: Sep. 11, 2020

(65) Prior Publication Data

US 2021/0003842 A1    Jan. 7, 2021

Related U.S. Application Data

(63) Continuation of application No. 16/132,223, filed on Sep. 14, 2018, now Pat. No. 10,775,614.

(60) Provisional application No. 62/564,176, filed on Sep. 27, 2017.

(51) Int. Cl.
G02B 27/00 (2006.01)
H04N 5/232 (2006.01)
H04N 5/225 (2006.01)
G02B 7/10 (2021.01)

(52) U.S. Cl.
CPC .......... *G02B 27/0037* (2013.01); *G02B 7/10* (2013.01); *H04N 5/2253* (2013.01); *H04N 5/2254* (2013.01); *H04N 5/23212* (2013.01); *H04N 5/23248* (2013.01)

(58) Field of Classification Search
CPC .... G02B 27/0037; G02B 7/10; H04N 5/2253; H04N 5/23248; H04N 5/2254; H04N 5/23212

See application file for complete search history.

(56) References Cited

U.S. PATENT DOCUMENTS

| 7,031,071 | B2 | 4/2006 | Nishioka |
| 9,376,066 | B2 | 6/2016 | Lu |
| 10,775,614 | B1* | 9/2020 | Gross ................. H04N 5/23248 |
| 2006/0164540 | A1 | 7/2006 | Kayanuma |
| 2010/0231783 | A1 | 9/2010 | Bueler et al. |
| 2011/0176050 | A1 | 7/2011 | Fisher et al. |
| 2012/0257278 | A1* | 10/2012 | Simonov ............ G11B 7/13927 359/557 |
| 2014/0029120 | A1 | 1/2014 | Kim |
| 2014/0092493 | A1 | 4/2014 | Topliss |
| 2015/0002725 | A1 | 1/2015 | Yamasaki |
| 2015/0185493 | A1 | 7/2015 | Aoki |

(Continued)

*Primary Examiner* — Timothy J Henn
(74) *Attorney, Agent, or Firm* — Robert C. Kowert; Kowert, Hood, Munyon, Rankin & Goetzel, P.C.

(57) ABSTRACT

Various embodiments disclosed herein include optical aberration control for a camera system. Such a camera system may implement optical aberration control, e.g., by combining one or more variable focus devices with one or more actuators (e.g., a voice coil motor actuator) for moving a lens stack of the camera system to provide autofocus (AF) and/or optical image stabilization (OIS) functionality. A variable focus device may have variable optical power to achieve AF, OIS, and/or introduce optical aberrations such as spherical aberration. In some implementations, the variable focus device may be driven to introduce optical aberrations, and the actuator for moving the lens stack may be driven to compensate for the optical power from the variable focus device.

20 Claims, 12 Drawing Sheets

(56) References Cited

U.S. PATENT DOCUMENTS

| | | |
|---|---|---|
| 2017/0038661 A1 | 2/2017 | Ha |
| 2017/0269374 A1* | 9/2017 | Takemoto ................ G02B 7/10 |
| 2018/0048793 A1 | 2/2018 | Gross et al. |
| 2018/0176451 A1* | 6/2018 | Asuncion ......... H04N 5/232127 |
| 2019/0018169 A1 | 1/2019 | Aschwanden |
| 2019/0033553 A1 | 1/2019 | Jeong |
| 2019/0158749 A1 | 5/2019 | Kunick et al. |
| 2019/0170914 A1 | 6/2019 | Fuller et al. |

\* cited by examiner

OPTICAL ABERRATION CONTROL FOR CAMERA

This application is a continuation of U.S. patent application Ser. No. 16/132,223, filed Sep. 14, 2018, which claims benefit of priority to U.S. Provisional Application No. 62/564,176, filed Sep. 27, 2017, which are hereby incorporated by reference herein in their entirety.

BACKGROUND

Technical Field

This disclosure relates generally to optical aberration control for small form factor camera systems and lens systems.

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

Some small form factor cameras may incorporate an autofocus (AF) mechanism whereby the object focal distance can be adjusted to focus an object plane or field in front of the camera at an image plane to be captured by an image sensor (also referred to herein as a photosensor). In some such autofocus mechanisms, the optical lens is moved as a single rigid body along the optical axis (referred to as the Z axis) of the camera to refocus the camera. In addition, high image quality is easier to achieve in small form factor cameras if lens motion along the optical axis is accompanied by minimal parasitic motion, e.g., tilt around the X and Y axes (which are orthogonal to the optical (Z) axis) of the camera. Parasitic motion of the lens due to tilting may cause the image plane to be tilted differently, with respect to the image sensor plane, at different focus positions, leading to side-to-side blurred-to-sharp images at certain focus positions. Furthermore, some small form factor cameras may incorporate optical image stabilization (OIS) mechanisms that may deliberately move the lens to try to compensate for small rotations around the X and Y axes (e.g., caused by handshake).

SUMMARY OF EMBODIMENTS

In some embodiments, a camera system may include a lens stack, an image sensor, a first actuator to move the lens stack or the image sensor, and a variable focus device having variable optical power. The lens stack may include one or more lens elements that define an optical axis. The image sensor may capture light projected onto a surface of the image sensor. The first actuator may move the lens stack or the image sensor along at least one of the optical axis or a plane that is orthogonal to the optical axis. In some examples, the first actuator may be a voice coil motor (VCM) actuator that includes one or more magnets and one or more coils. According to various embodiments, the variable focus device may include a flexible lens and a second actuator. The second actuator may change a shape of the flexible lens to vary the optical power of the variable focus device. For instance, the second actuator may change the shape of the flexible lens at least partly in response to application of a voltage to the second actuator.

In some embodiments, a device (e.g., a mobile multifunction device) may include a camera, a display, and one or more processors. In various examples, the camera may include one or more of the features discussed above with respect to the camera system. In some examples, the camera may include an image sensor, a lens stack, a first actuator to move the lens stack or the image sensor, and a variable focus device comprising a second actuator to vary the optical power of the variable focus device.

In some examples, the processor(s) may cause the camera to implement an optical aberration adjustment with respect to an image of a scene captured at least partly via the image sensor. The image may include optical aberration content based at least in part on the optical aberration adjustment. For instance, the optical aberration content may include coma artifacts, vignetting artifacts, and/or bokeh artifacts in some embodiments. To cause the camera to implement the optical aberration adjustment, the processor(s) may cause actuation of the first actuator and/or the second actuator. In some cases, the processor(s) may cause the camera to implement a focus adjustment with respect to at least a portion of the scene. To cause the camera to implement the focus adjustment, the processor(s) may cause actuation of the first actuator and/or the second actuator. In some implementations, the processor(s) may cause actuation of the second actuator to vary the optical power of the variable focus device to implement the optical aberration adjustment, and the processor(s) may cause actuation of the first actuator to move the lens stack along at least the optical axis to implement the focus adjustment. In other implementations, the processor(s) may cause actuation of the first actuator to move the lens stack along at least one of the optical axis or the plane that is orthogonal to the optical axis to implement the optical aberration adjustment, and the processor(s) may cause actuation of the second actuator to vary the optical power of the variable focus device to implement the focus adjustment.

In some embodiments, the optical aberration adjustment may cause a change in effective focal length of a lens system of the camera. The lens system may include the lens stack and the variable focus device. To implement the focus adjustment, the processor(s) may cause actuation of at least one of the first actuator or the second actuator to compensate, at least in part, for the change in effective focal length caused by the optical aberration adjustment.

In some embodiments, a method may include determining optical aberration content to be introduced to an image. The image may be captured at least partly via an image sensor of a camera. Furthermore, the method may include determining an effective focal length for a lens system of the camera for capturing the image. In some implementations, the method may include adjusting the lens system of the camera such that the optical aberration content is introduced to the image and the effective focal length for the lens system is obtained. Such an adjustment of the lens system may include moving one or more lens elements of the lens system relative to the image sensor. For instance, the lens elements may be moved at least partly via a first actuator. Moreover, adjusting the lens system may include adjusting an optical power of a variable focus device of the lens system. For instance, the optical power of the variable focus device may be adjusted via a second actuator. The second actuator may be part of the variable focus device in various embodiments.

BRIEF DESCRIPTION OF THE DRAWINGS

FIG. 2A shows a schematic top view of the variable focus device. FIG. 2B shows a schematic side view of the variable focus device.

Figure 1:
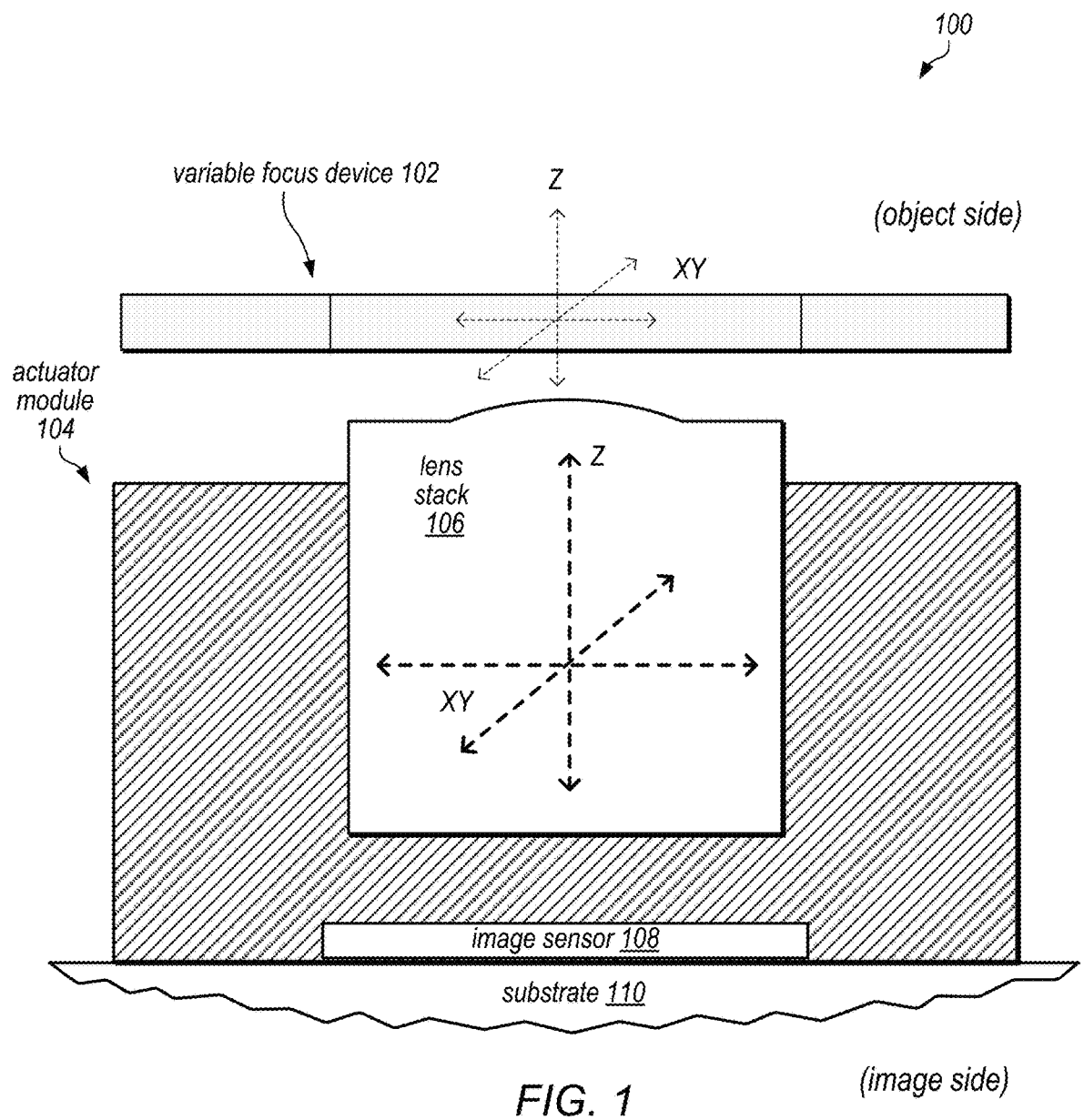
FIG. 1 illustrates a schematic side view of an example camera system that may implement optical aberration control, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments disclosed herein include optical aberration control for a camera system (which may also be referred to herein as a "camera"). Such a camera system may implement optical aberration control, e.g., by combining one or more variable focus devices with one or more actuators (e.g., a voice coil motor actuator) for moving a lens stack of the camera system to provide autofocus (AF) and/or optical image stabilization (OIS) functionality. A variable focus device may have variable optical power to achieve AF, OIS, and/or introduce optical aberrations, such as spherical aberrations, to images. In some non-limiting examples, the optical aberrations may include coma artifacts, vignetting artifacts, and/or bokeh artifacts, etc.

According to some embodiments, a lens system of the camera may include the variable focus device and the lens stack. In some implementations, the variable focus device may be driven to introduce optical aberrations, e.g., to achieve desired optical effects in images captured by the camera system, and the actuator for moving the lens stack may be driven to nullify or compensate for a change in effective focal length of the lens system caused by driving the variable focus device. In other implementations, the actuator for moving the lens stack may be driven to introduce optical aberrations, and the variable focus device may be driven to compensate for or nullify a change in effective focal length of the lens system caused by driving the actuator for moving the lens stack.

According to various embodiments, camera systems described herein may provide for introducing optical aberrations in a customizable and/or tunable manner. Such camera systems, combined with or without one or more image fusion algorithms, may optically generate and/or simulate some effects produced by mechanically variable aperture lenses in some instances. In some examples, camera systems described herein may be used to achieve shallow depth of field image capturing. In some instance, camera systems described herein may be used to introduce optical aberrations to a portion of a scene on which a lens system is focused. As an example, optical aberrations may be introduced to the focused portion to soften a person's facial features, e.g., by reducing pore visibility.

In some embodiments, the camera system may include an image sensor, a lens stack, a first actuator to move the lens stack or the image sensor, and a variable focus device having variable optical power. The lens stack may include one or more lens elements that define an optical axis. The image sensor may be configured to capture light that has passed through the lens stack and the variable focus device. The first actuator may move the lens stack or the image sensor along at least one of the optical axis or a plane that is orthogonal to the optical axis. In some examples, the first actuator may be a voice coil motor (VCM) actuator that includes one or more magnets and one or more coils. According to various embodiments, the variable focus device may include a flexible lens and a second actuator. The second actuator may change a shape of the flexible lens to vary the optical power of the variable focus device. For instance, the second actuator may change the shape of the flexible lens at least partly in response to application of a voltage to the second actuator.

In some cases, the image sensor may be to a first side of the lens stack, and the variable focus device may be to a second side of the lens stack that is opposite the first side. In some examples, the variable focus device may be located between the image sensor and the lens stack.

According to some embodiments, the variable focus device may be a first solid-state microelectromechanical system (MEMS) device that includes a first flexible lens. In some examples, the first flexible lens may be disposed along the optical axis defined by the lens elements of the lens stack. In some examples, the camera system may include multiple variable focus devices. For example, the camera system may include a second variable focus device that may vary its optical power independently of the first variable focus device. In some cases, the second variable focus device may be a second solid-state MEMS device that includes a second flexible lens. The second flexible lens may be disposed along the optical axis in some implementations.

In some embodiments, a device (e.g., a mobile multifunction device) may include a camera and one or more processors. In various examples, the camera may include one or more of the features discussed above with respect to the camera system. In some examples, the camera may include an image sensor, a lens stack, a first actuator to move the lens stack or the image sensor, and a variable focus device comprising a second actuator to vary the optical power of the variable focus device. The lens stack may include one or more lens elements that define an optical axis. The first actuator may move the lens stack or the image sensor along at least one of the optical axis or a plane that is orthogonal to the optical axis. The image sensor may be configured to capture light that has passed through the lens stack and the variable focus device.

According to some examples, the first actuator may be a VCM actuator that includes one or more magnets and one or more coils. Furthermore, the variable focus device may include a flexible lens. The second actuator of the variable focus device may change a shape of the flexible lens to vary the optical power of the variable focus device.

In some embodiments, the processor(s) may cause the camera to implement an optical aberration adjustment with respect to an image of a scene captured at least partly via the image sensor. The image may include optical aberration content based at least in part on the optical aberration adjustment. For instance, the optical aberration content may include coma artifacts, vignetting artifacts, and/or bokeh artifacts in some embodiments. To cause the camera to implement the optical aberration adjustment, the processor(s) may cause actuation of at least one of the first actuator or the second actuator.

In some examples, the processor(s) may cause the camera to implement a focus adjustment with respect to at least a portion of the scene. To cause the camera to implement the focus adjustment, the processor(s) may cause actuation of at least one of the first actuator or the second actuator. In some implementations, the processor(s) may cause actuation of the second actuator to vary the optical power of the variable focus device to implement the optical aberration adjustment, and the processor(s) may cause actuation of the first actuator to move the lens stack along at least the optical axis to implement the focus adjustment. In other implementations, the processor(s) may cause actuation of the first actuator to move the lens stack along at least one of the optical axis or the plane that is orthogonal to the optical axis to implement the optical aberration adjustment, and the processor(s) may cause actuation of the second actuator to vary the optical power of the variable focus device to implement the focus adjustment.

In some embodiments, the optical aberration adjustment may cause a change in effective focal length of a lens system of the camera. The lens system may include the lens stack and the variable focus device. To implement the focus adjustment, the processor(s) may cause actuation of at least one of the first actuator or the second actuator to compensate, at least in part, for the change in effective focal length caused by the optical aberration adjustment.

In some implementations, the first actuator may be configured to adjust an effective focal length of the lens system at a first rate. For instance, the first actuator may be configured to adjust the effective focal length of the lens system at the first rate by moving the lens stack or the image sensor along at least one of the optical axis or the plane that is orthogonal to the optical axis. Furthermore, the second actuator of the variable focus device may be configured to adjust the effective focal length of the lens system at a second rate that is higher than the first rate. For instance, the second actuator may be configured to adjust the effective focal length of the lens system at the second rate by varying the optical power of the variable focus device.

According to some examples, the first actuator may be a voice coil motor (VCM) actuator that includes one or more magnets and one or more coils. The variable focus device may include a flexible lens. To vary the optical power of the variable focus device, the second actuator may change a shape of the flexible lens. For example, the second actuator may change the shape of the flexible lens at least partly responsive to application of a voltage to the second actuator.

In some embodiments, the device may further include a display. The processor(s) may cause the display to present the image of the scene captured at least partly via the image sensor.

In various embodiments, a method may include determining one or more types of optical aberrations to be introduced to an image. The image may be captured at least partly via an image sensor of a camera. Furthermore, the method may include determining an effective focal length for a lens system of the camera for capturing the image.

In some implementations, the method may include adjusting the lens system of the camera such that the type(s) of optical aberrations are introduced to the image and the effective focal length for the lens system is obtained. Such an adjustment of the lens system may include moving one or more lens elements of the lens system relative to the image sensor. For instance, the lens elements may be moved at least partly via a first actuator. Moreover, adjusting the lens system may include adjusting an optical power of a variable focus device of the lens system. For instance, the optical power of the variable focus device may be adjusted via a second actuator. The second actuator may be part of the variable focus device in various embodiments.

According to some examples, moving the lens elements may include actuating the first actuator to move the one or more lens elements along at least an optical axis of the camera such that the type(s) of optical aberration content are introduced to the image. Such movement of the lens elements along the optical axis may cause a change in effective focal length of the lens system. According to some examples, adjusting the optical power of the variable focus device may include actuating the second actuator to change a shape of a flexible lens of the variable focus device to reduce the change in effective focal length caused by moving the lens elements along the optical axis.

In some cases, adjusting the optical power of the variable focus device may include actuating the second actuator to change a shape of the flexible lens of the variable focus device such that the optical aberration content is introduced to the image. Changing the shape of the flexible lens may cause a change in effective focal length of the lens system. In some cases, moving the lens elements may include actuating the first actuator to move the lens elements along at least an optical axis of the camera to reduce the change in effective focal length caused by changing the shape of the flexible lens.

In some examples, the method may include detecting one or more characteristics associated with the camera. For instance, the method may include detecting position information associated with positioning of the lens elements. In some cases, the position information may be detected at least partly via a first sensor. The first sensor may be a position sensor such as a magnetic field sensor (e.g., a Hall sensor, a tunneling magnetoresistance (TMR) sensor, a giant magnetoresistance (GMR) sensor, etc.). Additionally, or alternatively, the method may include detecting temperature information associated with the lens system. In some cases, the temperature information may be detected at least partly via a second sensor, e.g., a temperature sensor. Additionally, or alternatively, the method may include detecting capacitance information associated with the variable focus device. The variable focus device may include the second actuator and a flexible lens in some embodiments. In some cases, the capacitance information may be detected at least partly via a third sensor, e.g., a capacitive sensor. According to some implementations, adjusting the lens system of the camera may be based at least in part on the detected position information, the detected temperature information, the detected capacitance information, and/or any other suitable information associated with the camera. For instance, a voltage to be applied to the first actuator and/or the second actuator may be determined based at least in part on information detected by one or more sensors such as the first sensor, the second sensor, and/or the third sensor.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a schematic side view of an example camera system 100 that may implement optical aberration control, in accordance with some embodiments. The camera system 100 may include a variable focus device 102 and an actuator module 104 for moving a lens stack 106 or an image sensor 108. In some embodiments, the camera system 100 may include one or multiple features, components, and/or functionality of embodiments described herein with reference to FIGS. 2A-12.

In some embodiments, the variable focus device 102 may be located on the object side of the lens stack 106 in front of a first lens of the stack 106, while the image sensor 106 may be located on the image side of the lens stack 106. While FIG. 1 shows a single variable focus device 102, it should be understood that in various embodiments the camera system 100 may include multiple variable focus devices. The variable focus device 102 may include, but is not limited to, a substrate (e.g., a clear glass or plastic substrate), a flexible optical element (e.g., a flexible lens), and an actuator that is configured to dynamically change the shape of the flexible optical element to provide adaptive optical functionality for the camera system 100. The optical functionality provided by the variable focus device 102 may include autofocus (AF) functionality, optical image stabilization (OIS) functionality, and/or zoom functionality, for example. The variable focus device 102 may also be referred to as a SSAF (Solid-State AutoFocus) and/or SSOIS (Solid-State Optical Image Stabilization) component or module.

In various embodiments, the actuator module 104 may be configured to move the lens stack 106 along an optical axis and/or in directions orthogonal to the optical axis. The lens stack 106 may include one or more lens elements that define the optical axis. In various embodiments, one or more lens elements of the lens stack 106 may have fixed optical properties. For instance, in contrast to the variable focus device 102, the lens elements of the lens stack 106 may not be flexible lens elements that can be deformed to allow for variable optical power. In some embodiments, the actuator module 104 may provide AF and/or OIS functionality for the camera system 100. The actuator module 104 may, for example, include a voice coil motor (VCM) actuator mechanism. The actuator module 104 may, for example, be mounted to a substrate 110 that holds the image sensor 108 of the camera system 100. The actuator module 104 may provide motion to the lens stack 106 on the Z (optical) axis and/or in the XY plane (a plane orthogonal to the optical axis). The XY plane motion may, for example, provide OIS by moving the lens stack 106 on the X and/or Y axis relative to the image sensor 108. The Z axis motion may, for example, provide optical focusing or AF for the camera system 100 by moving the lens stack 106 on the Z axis relative to the image sensor 108.

Embodiments of a camera system as described herein may be implemented in a small package size while still capturing sharp, high-resolution images, making embodiments of the camera suitable for use in small and/or mobile multifunction devices such as cell phones, smartphones, pad or tablet computing devices, laptop, netbook, notebook, subnotebook, and ultrabook computers, and so on. However, note that aspects of the camera system may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications. In some embodiments, a camera system as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device. In some examples, a first camera of a camera system may be structurally and/or functionally different than a second camera of the camera system that is proximate the first camera. For example, the first camera may include a variable focus device 102, while the second camera may not include a variable focus device. In some examples, the first camera and the second camera may include a different number of variable focus devices. In some embodiments, the first camera may be capable of implementing optical aberration control as described herein, and the second camera may not be capable of implementing such optical aberration control.

Figure 2A:
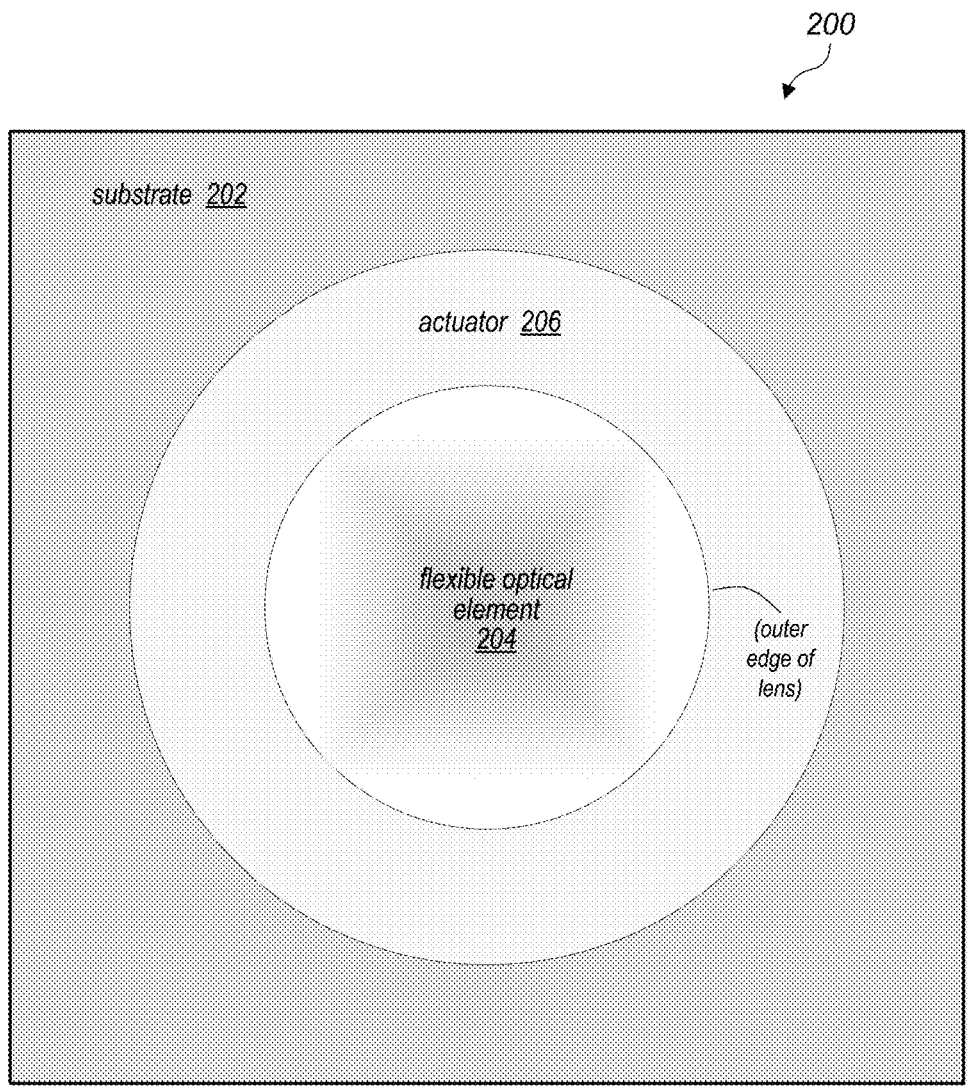
FIGS. 2A and 2B illustrate an example variable focus device that may be included in a camera system to implement optical aberration control, in accordance with some embodiments.
Figure 2B:
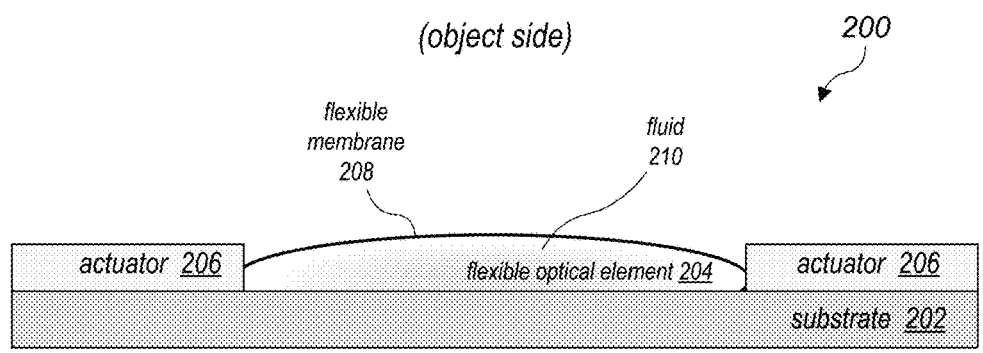

FIGS. 2A and 2B illustrate an example variable focus device 200 that may be included in a camera system to implement optical aberration control, in accordance with some embodiments. FIG. 2A shows a schematic top view of the variable focus device 200. FIG. 2B shows a schematic side view of the variable focus device 200. In some embodiments, the variable focus device 200 may include one or multiple features, components, and/or functionality of embodiments described herein with reference to FIGS. 1 and 3-12.

In various embodiments, the variable focus device 200 may include, but is not limited to, a substrate 202 (e.g., a clear glass or plastic substrate), a flexible optical element 204 (e.g., a flexible lens), and an actuator 206 component that is configured to change the shape of the flexible optical element 204 to provide adaptive optical functionality for a camera. The flexible optical element 204 may include a flexible membrane 208 and a fluid 210 (e.g., optical oil) in one or more cavities between the flexible membrane 208 and a surface of the substrate 202. The actuator 206 may be configured to change the shape of the flexible optical element 204 to vary an optical power of the variable focus device 200, e.g., to provide one or more optical functionalities for a camera system. While FIG. 2B shows the flexible optical element 204 with a curved membrane 208, in some embodiments the flexible optical element 204 may be made substantially flat to focus at infinity. While FIG. 2B shows the substrate 202 as rectangular or square, the substrate 202 may be other shapes (e.g., round).

Figure 3:
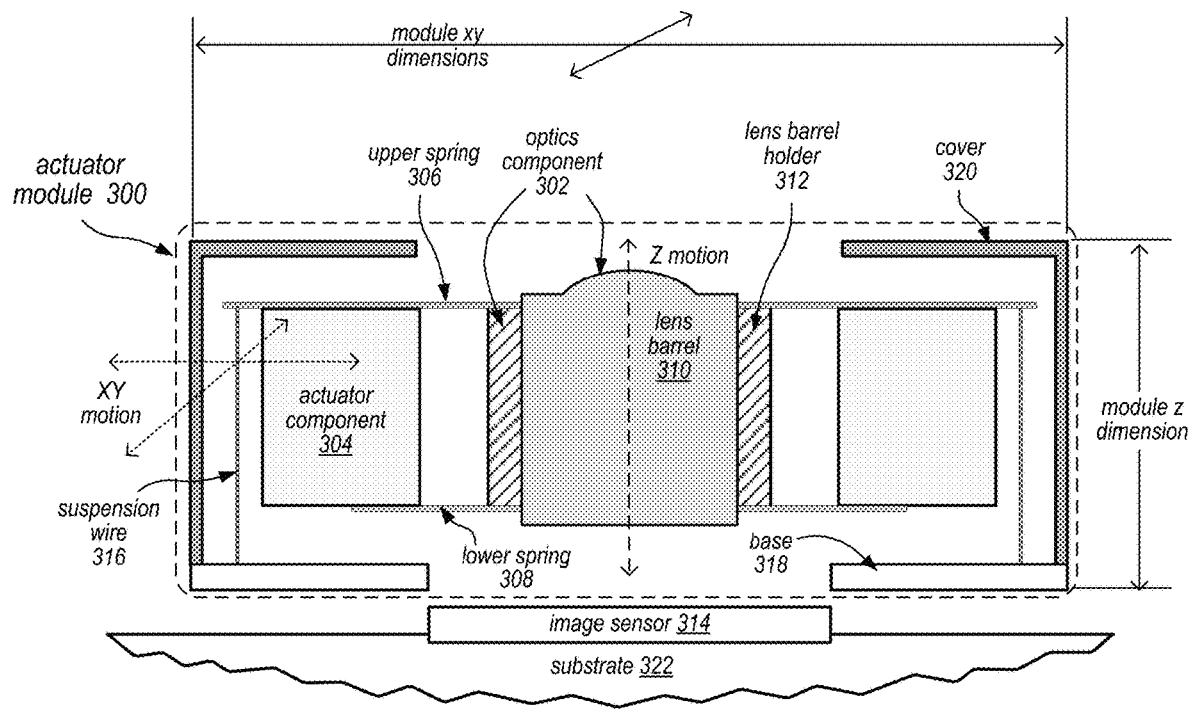
FIG. 3 illustrates a schematic side view of an example actuator module that may move a lens stack and that may be included in a camera system to implement optical aberration control, in accordance with some embodiments.

FIG. 3 illustrates a schematic side view of an example actuator module 300 that may move a lens stack and that may be included in a camera system to implement optical aberration control, in accordance with some embodiments. In some embodiments, the actuator module 300 may include one or multiple features, components, and/or functionality of embodiments described herein with reference to FIGS. 1-2B and 4-12.

In some examples, the actuator module 300 may include an optics component 302 that is coupled to an actuator component 304 by upper spring 306 and/or lower spring 308. The optics component 302 may include a lens barrel 310 that includes a stack of one or more lens elements (or a lens stack) and a lens barrel holder 312. The object side of the optics component 302 may be oriented to the top or upper side or surface of the actuator module 300, while the image side of the optics component 302 may be oriented to the bottom or lower side or surface of the actuator module 300. The actuator component 304 may, for example, include one or more magnets and/or one or more coils used in a VCM actuator mechanism. It should be understood, however, that the actuator module 300 may additionally or alternatively utilize any other suitable type of actuator mechanism. The springs 306 and 308 may be flexible to allow motion of the optics component 302 on the Z axis relative to the actuator component 304 and image sensor 314. The actuator component 304 may be configured to move the optics component 302 and thus the lens barrel 310 on the Z axis within the actuator module 300 and relative to the image sensor 314 to provide focusing or autofocus for a camera. An assembly which includes the optics component 302, actuator component 304, and/or springs 306 and 308 may be suspended within the actuator module 300 on two or more suspension wires 316. For example, the suspension wires 316 may be mounted to base 318, and the assembly may be suspended on the wires 316 at the outer portion of the upper springs 306. The suspension wires 316 may be flexible to allow motion of the assembly, and thus of the optics component 302, on the XY axes orthogonal to the Z (optical) axis of the optics component 302. The actuator component 304 may be configured to move the optics component 302 and thus the lens barrel 310 on the XY axes within the actuator module 300 and relative to the image sensor 314 to provide optical image stabilization (OIS) for the camera. A cover 320 for the assembly may be attached to the base 318 of the actuator module 300. The assembled actuator module 300 may, for example, be mounted to a substrate 322 that holds and/or includes the image sensor 314 of the camera.

Figure 4:
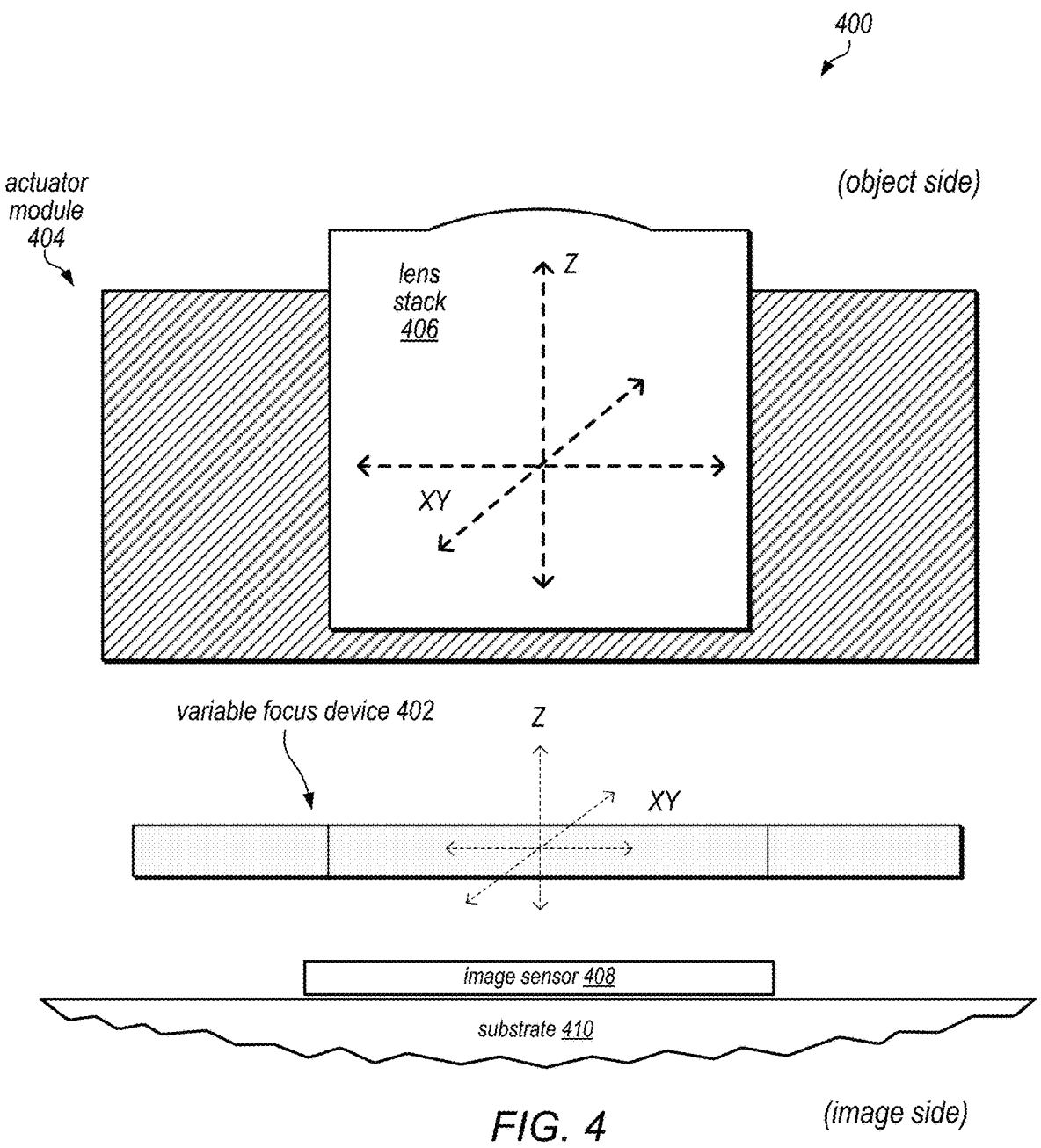
FIG. 4 illustrates a schematic side view of another example camera system that may implement optical aberration control, in accordance with some embodiments.

FIG. 4 illustrates a schematic side view of another example camera system 400 that may implement optical aberration control, in accordance with some embodiments. The camera system 400 may include a variable focus device 402 and an actuator module 404 for moving a lens stack 406 or an image sensor 408, in accordance with some embodiments. In some embodiments, the camera system 400 may include one or multiple features, components, and/or functionality of embodiments described herein with reference to FIGS. 1-3 and 5-12.

In some embodiments, the variable focus device 402 may be located on the image side of the lens stack 406, e.g., between the lens stack 106 and the image sensor 408. While FIG. 4 shows a single variable focus device 402, it should be understood that in various embodiments the camera system 400 may include multiple variable focus devices. The variable focus device 402 may include, but is not limited to, a substrate (e.g., a clear glass or plastic substrate), a flexible optical element (e.g., a flexible lens), and an actuator that is configured to dynamically change the shape of the flexible optical element to provide adaptive optical functionality for the camera system 400. The optical functionality provided by the variable focus device 402 may include autofocus (AF) functionality, optical image stabilization (OIS) functionality, and/or zoom functionality, for example.

In various embodiments, the actuator module 404 may be configured to move the lens stack 406 along an optical axis and/or in directions orthogonal to the optical axis. The lens stack 406 may include one or more lens elements that define the optical axis. In some embodiments, the actuator module 404 may provide AF and/or OIS functionality for the camera system 400. The actuator module 404 may, for example, be mounted to a substrate 410 that holds the image sensor 408 of the camera system 400. The actuator module 404 may provide motion to the lens stack 406 on the Z (optical) axis and/or in the XY plane (a plane orthogonal to the optical axis). The XY plane motion may, for example, provide OIS by moving the lens stack 406 on the X and/or Y axis relative to the image sensor 406. The Z axis motion may, for example, provide optical focusing or AF for the camera system 400 by moving the lens stack 406 on the Z axis relative to the image sensor 408.

Figure 5:
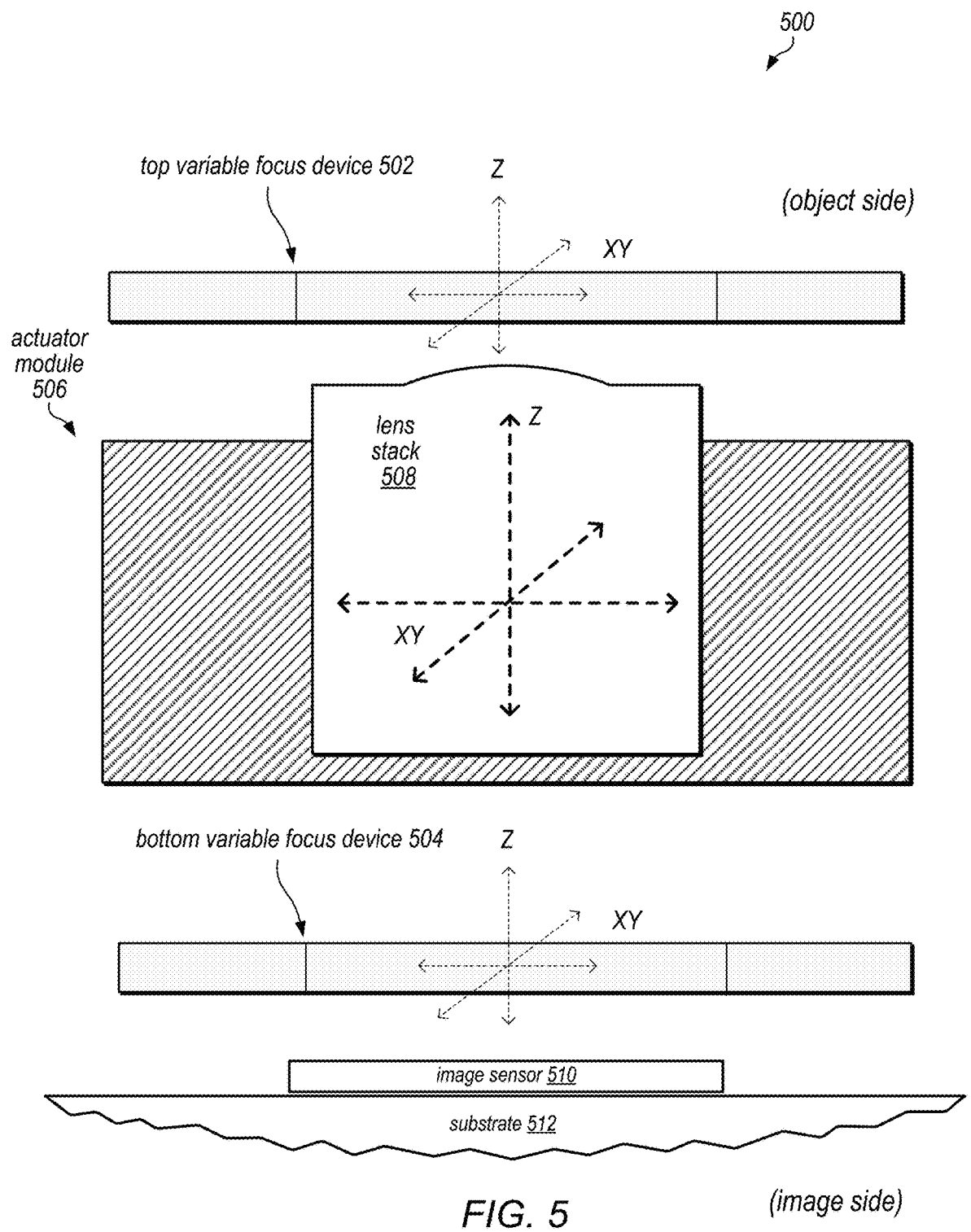
FIG. 5 illustrates a schematic side view of yet another example camera system that may implement optical aberration control, in accordance with some embodiments.

FIG. 5 illustrates a schematic side view of yet another example camera system 500 that may implement optical aberration control, in accordance with some embodiments. The camera system 500 may include a variable focus device (e.g., top variable focus device 502 and bottom variable focus device 504) and an actuator module 506 for moving a lens stack 508 or an image sensor 510, in accordance with some embodiments. In some embodiments, the camera system 500 may include one or multiple features, components, and/or functionality of embodiments described herein with reference to FIGS. 1-4 and 6-12.

In some embodiments, the top variable focus device 502 may be located on the object side of the lens stack 508 in front of a first lens of the stack 508, while the image sensor 510 may be located on the image side of the lens stack 508. While FIG. 5 shows a single top variable focus device 502, it should be understood that in various embodiments the camera system 500 may include multiple top variable focus devices. The bottom variable focus device 504 may be located on the image side of the lens stack 508, e.g., between the lens stack 508 and the image sensor 510. While FIG. 5 shows a single bottom variable focus device 504, it should be understood that in various embodiments the camera system 500 may include multiple bottom variable focus devices 500. Each of the top variable focus device 502 and the bottom variable focus device 504 may include, but is not limited to, a respective substrate (e.g., a clear glass or plastic substrate), a respective flexible optical element (e.g., a flexible lens), and a respective actuator that is configured to dynamically change the shape of the respective flexible optical element to provide adaptive optical functionality for the camera system 500. The optical functionality provided by the top variable focus device 502 and/or the bottom variable focus device 504 may include autofocus (AF) functionality, optical image stabilization (OIS) functionality, and/or zoom functionality, for example.

In various embodiments, the actuator module 506 may be configured to move the lens stack 508 along an optical axis and/or in directions orthogonal to the optical axis. The lens stack 508 may include one or more lens elements that define the optical axis. In some embodiments, the actuator module 506 may provide AF and/or OIS functionality for the camera system 500. The actuator module 506 may, for example, be mounted to a substrate 512 that holds the image sensor 510 of the camera system 500. The actuator module 506 may provide motion to the lens stack 508 on the Z (optical) axis and/or in the XY plane (a plane orthogonal to the optical axis). The XY plane motion may, for example, provide OIS by moving the lens stack 508 on the X and/or Y axis relative to the image sensor 510. The Z axis motion may, for example, provide optical focusing or AF for the camera system 500 by moving the lens stack 508 on the Z axis relative to the image sensor 510.

Figure 6:
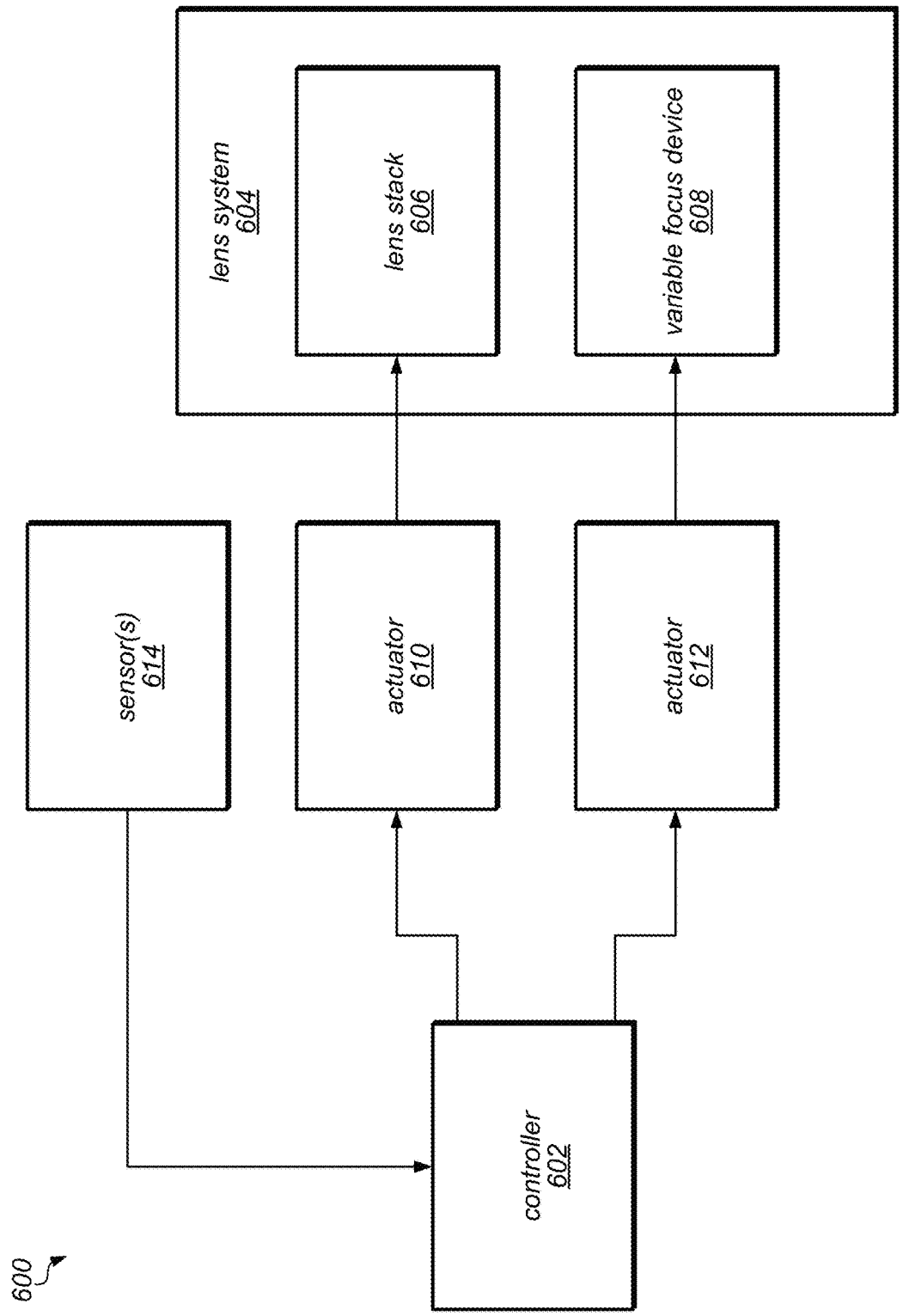
FIG. 6 illustrates a block diagram of an example control system of a camera system that may implement optical aberration control, in accordance with some embodiments.

FIG. 6 illustrates a block diagram of an example camera system 600 having a controller 602 for implementing optical aberration control, in accordance with some embodiments. In some embodiments, the control system 600 may include one or multiple features, components, and/or functionality of embodiments described herein with reference to FIGS. 1-5 and 7-12.

In some embodiments, the camera system 600 may include the controller 602 and a lens system 604. The controller 602 may include one or more processors that cause components of the camera system 600 to perform various operations, which may include operations of the methods described herein. The lens system 604 may include a lens stack 606 and a variable focus device 608. The lens stack 606 may include one or more lenses that define an optical axis.

In some examples, the camera system 600 may include a first actuator 610. The controller 602 may be configured to control the first actuator 610 to move the lens stack 606 relative to an image sensor (not shown) of the camera system 600. For instance, the controller 602 may cause the lens stack 606 to move, relative to the image sensor, along the optical axis and/or a plane that is orthogonal to the optical axis. While not illustrated in FIG. 6, the controller 602 may additionally, or alternatively, be configured to control an image sensor of the camera system 600 relative to the lens stack 606. For instance, the controller 602 may cause the image sensor to move, relative to the lens stack 606, along the optical axis and/or a plane that is orthogonal to the optical axis.

In some examples, the variable focus device 608 and/or the camera system 600 may include a second actuator 612. The controller 602 may be configured to control the second actuator 612 to adjust an optical power of the variable focus device 608.

In various embodiments, the controller 602 may be configured to cause the camera system 600 to implement an optical aberration adjustment, e.g., with respect to an image of a scene captured at least partly via the image sensor. The optical aberration adjustment may be implemented such that the image includes optical aberration content. In various embodiments, the controller 602 may implement the optical aberration adjustment by causing actuation of the first actuator 610 and/or the second actuator 612. In some cases, the controller 602 may cause the camera system 600 to implement a focus adjustment. For instance, the optical aberration adjustment may cause a change in effective focal length of the lens system 604. The focus adjustment may be implemented to obtain and/or maintain a desired effective focal length of the lens system 604. For instance, the controller 602 may implement the focus adjustment by causing actuation of the first actuator 610 and/or the second actuator 612 to compensate, at least in part, for the change in effective focal length caused by the optical aberration adjustment.

In some embodiments, the controller 602 may implement the optical aberration adjustment by causing actuation of the second actuator 612 to vary the optical power of the variable focus device 608. Furthermore, the controller 602 may implement the focus adjustment by causing actuation of the first actuator 610 to move the lens stack 606 along at least the optical axis.

In some embodiments, the controller 602 may implement the optical aberration adjustment by causing actuation of the first actuator 610 to move the lens stack 606 along the optical axis and/or a plane that is orthogonal to the optical axis. Furthermore, the controller 602 may implement the focus adjustment by causing actuation of the second actuator 612 to vary the optical power of the variable focus device 608.

In various embodiments, the camera system 600 may include one or more sensors 614 for detecting one or more characteristics associated with the camera system 600. The controller 614 may receive signals from the sensor(s) 614 as inputs and use those inputs to make determinations for controlling the first actuator 610 and/or the second actuator 612. In some examples, the sensor(s) 614 may include one or more sensors for detecting position information associated with positioning of the lens element(s) of the lens stack 606. For instance, the sensor(s) 614 may include a position sensor such as a magnetic field sensor (e.g., a Hall sensor, a tunneling magnetoresistance (TMR) sensor, a giant magnetoresistance (GMR) sensor, etc.). In some examples, the sensor(s) 614 may include one or more sensors for detecting temperature information associated with the lens system 604. For instance, the sensor(s) 614 may include a temperature sensor. In some examples, the sensor(s) may include one or more sensors for detecting capacitance information associated with the variable focus device 608. For instance, the sensor(s) 614 may include a capacitive sensor. The sensor(s) 614 may additionally, or alternatively, include any other type of sensor suitable for detecting characteristics associated with the camera system 600.

In some examples, the controller 602 may cause movement of the lens stack 606 and cause an adjustment in the optical power of the variable focus device 608 based on a primary-subordinate lens relationship between the lens stack 606 and the variable focus device 608. For instance, the lens stack 606 may be a primary lens, and the variable focus device 608 may be a subordinate lens. The controller 602 may drive actuation of the primary lens (the lens stack 606, in this example) independently of the subordinate lens (the variable focus device 608, in this example). The controller 602 may drive actuation of the subordinate lens based at least in part on a lens driving relationship between the primary lens and the subordinate lens. In other examples, the variable focus device 608 may be the primary lens, and the lens stack 606 may be the subordinate lens.

Figure 7:
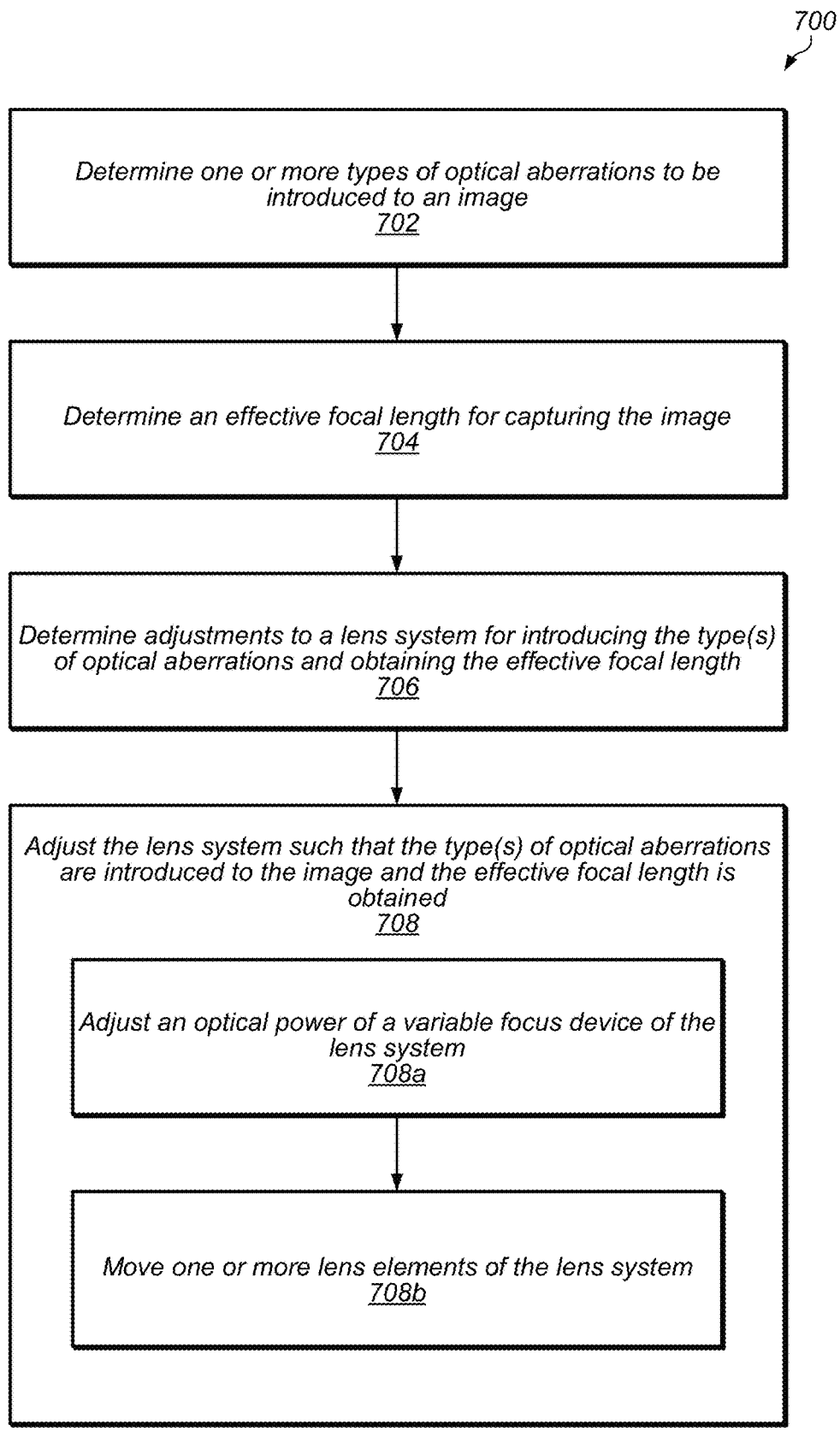
FIG. 7 is a flowchart of an example method of implementing an optical aberration adjustment, in accordance with some embodiments.

FIG. 7 is a flowchart of an example method 700 of implementing an optical aberration adjustment, in accordance with some embodiments. In some embodiments, the method 700 may include one or multiple features, components, and/or functionality of embodiments described herein with reference to FIGS. 1-6 and 8-12.

At 702, the method 700 may include determining one or more types of optical aberrations to be introduced to an image. The image may be captured via an image sensor of a camera system. In some examples, the camera system may determine (e.g., via a controller and/or one or more processors) the type(s) of optical aberrations to introduce to the image based at least in part on, e.g., contextual information surrounding the image capture, sensor information, historical information, environmental information, and/or user input, etc. For instance, the camera system may receive user input via a user interface presented to the user on a display. The user interface may provide, for example, a slider that the user may manipulate to indicate one or more preferences with respect to optical aberrations to be introduced to the image. As another example, the user interface may provide an option for the user to select a particular mode that can be used as an input for the camera system in making determinations with respect to optical aberrations to be introduced to the image.

At 704, the method 700 may include determining an effective focal length for capturing the image. The effective focal length may correspond to an effective focal length of a lens system that includes one or more lens elements and a variable focus device. The effective focal length of the lens system may be based at least in part on a first focal length component associated with the lens elements and a second focal length component associated with the variable focus device. In some examples, the camera system may determine the effective focal length based at least in part on, e.g., contextual information surrounding the image capture, sensor information, historical information, environmental information, and/or user input, etc. For instance, the camera system may receive user input via a user interface presented to the user on a display. The user interface may provide, for example, a slider that the user may manipulate to indicate one or more focus preferences. In some cases, determining the effective focal length for capturing the image, at 704, may occur before, after, and/or concurrently with determining type(s) of optical aberrations to be introduced to the image (at 702).

At 706, the method 700 may include determining adjustments to a lens system for introducing the type(s) of optical aberrations and obtaining the effective focal length. For instance, the camera system may determine how much and in what direction(s) to move the lens elements to an image sensor. Additionally, or alternatively, the camera system may determine how much to adjust an optical power of the variable focus device.

At 708, the method 700 may include adjusting the lens system such that the type(s) of optical aberration content are introduced to the image and the effective focal length is obtained. At 708*a*, the method 700 may include adjusting the optical power of the variable focus device of the lens system. The optical power of the variable focus device may be adjust at least partly via an actuator of the variable focus device in some embodiments. At 708*b*, the method 700 may include moving the lens elements of the lens system relative to an image sensor. The lens elements may be moved at least partly via another actuator that is different than the actuator used to adjust the optical power of the variable focus device. For instance, a voice coil motor (VCM) actuator may be used to move the lens elements in some embodiments. In some examples, moving the lens elements of the lens system relative to the image sensor, at 708*b*, may occur before, after, and/or concurrently with adjusting the optical power of the variable focus device (at 708*a*).

According to some examples, moving the lens elements of the lens system, at 708*a*, may include actuating a first actuator to move the one or more lens elements along at least an optical axis of the lens system such that the type(s) of optical aberrations are introduced to the image. Such movement of the lens elements along the optical axis may cause a change in the effective focal length of the lens system. According to some examples, adjusting the optical power of the variable focus device of the lens system, at 708*b*, may include actuating a second actuator to change a shape of a flexible lens of the variable focus device to reduce the change in the effective focal length caused by moving the lens elements along the optical axis.

In some cases, adjusting the optical power of the variable focus device, at 708*b*, may include actuating the second actuator to change a shape of the flexible lens of the variable focus device such that the type(s) of optical aberrations are introduced to the image. Changing the shape of the flexible lens may cause a change in focal length of the lens system. In some cases, moving the lens elements, at 708*a*, may include actuating the first actuator to move the lens elements along at least an optical axis of the lens system to reduce the change in the effective focal length caused by changing the shape of the flexible lens.

Figure 8:
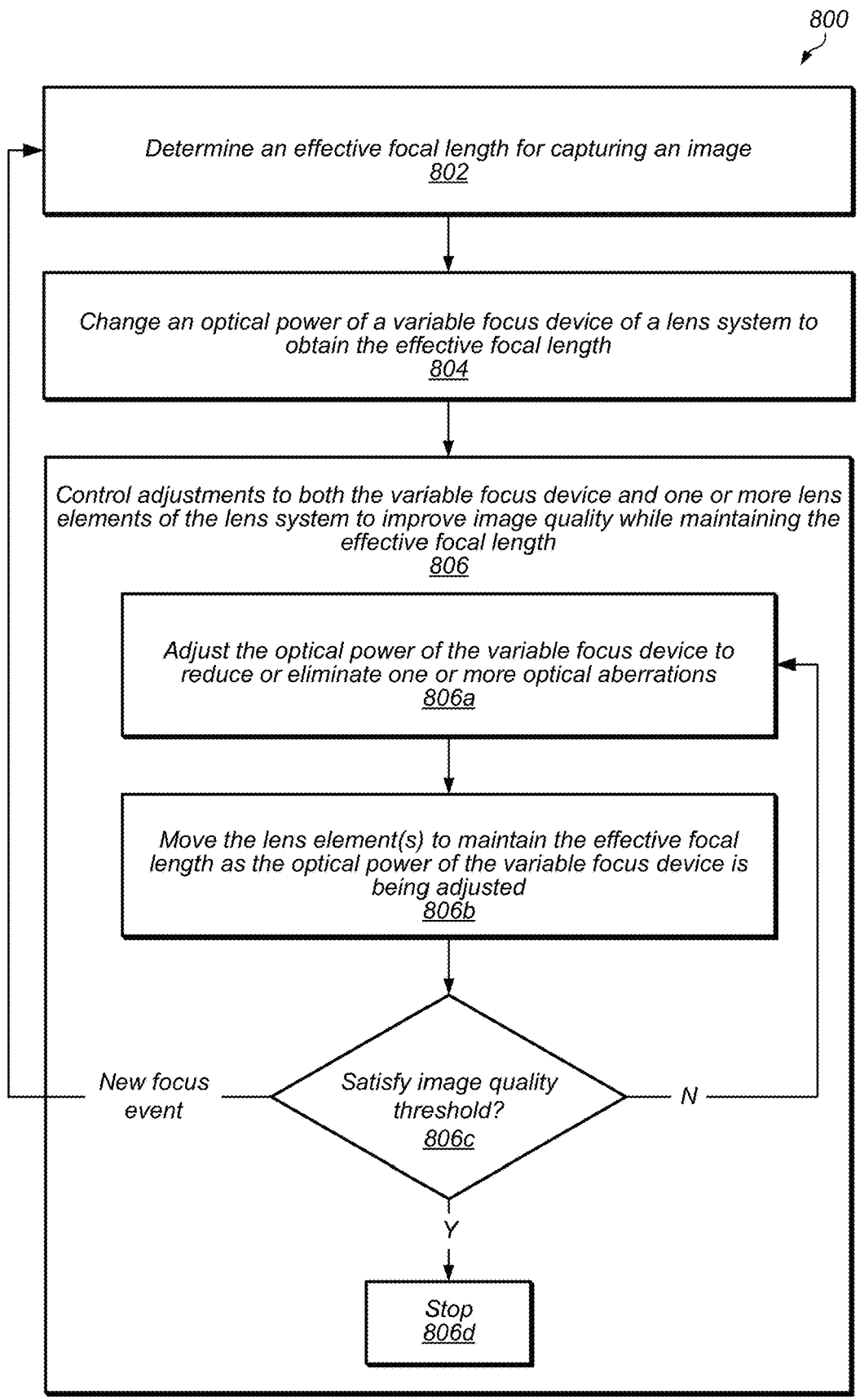
FIG. 8 is a flowchart of an example method of implementing a focus adjustment, in accordance with some embodiments.

FIG. 8 is a flowchart of an example method 800 of implementing a focus adjustment, in accordance with some embodiments. In some embodiments, the method 800 may include one or multiple features, components, and/or functionality of embodiments described herein with reference to FIGS. 1-7 and 9-12.

At 802, the method 800 may include determining an effective focal length for capturing an image. The image may be captured via an image sensor of a camera system. The effective focal length may correspond to an effective focal length of a lens system that includes one or more lens elements and a variable focus device. In some examples, a camera system may determine the effective focal length based at least in part on, e.g., contextual information surrounding the image capture, sensor information, historical information, environmental information, and/or user input, etc. For instance, the camera system may receive user input via a user interface presented to the user on a display. The user interface may provide, for example, a slider that the user may manipulate to indicate one or more focus preferences.

At 804, the method 800 may include changing an optical power of a variable focus device of a lens system to obtain the effective focal length. In various embodiments, the variable focus device may be capable of adjusting the effective focal length of the lens system faster than the lens elements. As such, the variable focus device may be used to rapidly adjust the effective focal length of the lens system.

At 806, the method 800 may include controlling adjustments to both the variable focus device and one or more lens elements of the lens system to improve image quality while maintaining the effective focal length. In some examples, improving image quality may include reducing or eliminating one or more optical aberrations introduced due to changing the optical power of the variable focus device to obtain the effective focal length (at 804). According to some examples, controlling adjustments to both the variable focus device and the lens elements, at 806, may include adjusting the optical power of the variable focus device to reduce or eliminate one or more optical aberrations introduced to the image, at 806*a*. Furthermore, controlling adjustments to both the variable focus device and the lens elements, at 806, may include moving the lens elements to maintain the effective focal length, e.g., as the optical power of the variable focus device is being adjusted, at 806*b*. At 806*c*, the method 800 may include determining whether an image quality threshold is satisfied. In some cases, the image quality threshold may be determined (e.g., by the controller and/or one or more processors of the camera system) based at least in part on, e.g., contextual information surrounding the image capture, sensor information, historical information, environmental information, and/or user input, etc. For instance, the camera system may receive user input via a user interface presented to the user on a display. The user interface may provide, for example, a slider that the user may manipulate to indicate one or more image quality preferences. If, at 806*c*, it is determined that the image quality threshold is satisfied, then the method 800 may end, at 806*d*. If, at 806*d*, it is determined that the image quality threshold is not satisfied, then the method 800 may return to adjusting the optical power of the variable focus device to reduce or eliminate optical aberrations, at 806. Upon a new focus event arising, the method 800 may return to determining an effective focal length for capturing the image, at 802.

Figure 9:
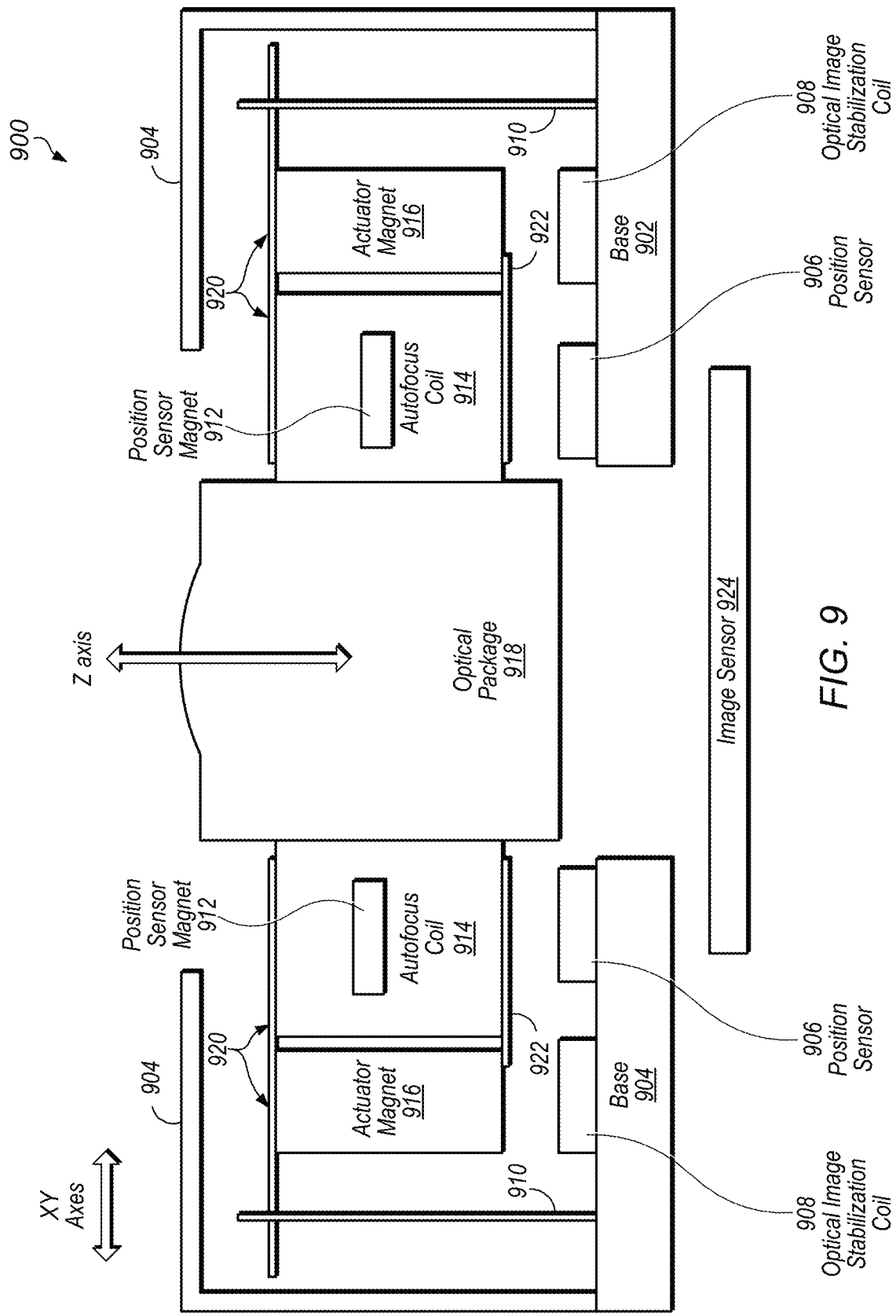
FIG. 9 illustrates a schematic side view of an example voice coil motor (VCM) actuator module that may move a lens stack and that may be included in a camera system to implement optical aberration control, in accordance with some embodiments.

FIG. 9 illustrates a schematic side view of an example voice coil motor (VCM) actuator module 900 that may move a lens stack and that may be included in a camera system to implement optical aberration control, in accordance with some embodiments. In some embodiments, the VCM actuator module 900 may include one or multiple features, components, and/or functionality of embodiments described herein with reference to FIGS. 1-8 and 10-12.

As shown in FIG. 9, the VCM actuator module 900 may include a base or substrate 902 and a cover 904. The base 902 may include and/or support one or more position sensors (e.g., Hall sensors, TMR sensors, GMR sensors, etc.) 906, one or more optical image stabilization coils 908, and one or more suspension wires 910, which may at least partly enable magnetic sensing for autofocus and/or optical image stabilization position detection, e.g., by detecting movements of position sensor magnets 912.

In some embodiments, the VCM actuator module 900 may include one or more autofocus coils 914 and one or more actuator magnets 916, which may at least partly enable autofocus functionality such as moving the optical package 918 along the z axis and/or along an optical axis defined by one or more lens elements of a lens stack of the optical package 918. In some examples, at least one position sensor magnet 912 may be disposed proximate to at least one autofocus coil 914. In some embodiments, at least one position sensor magnet 912 may be coupled to at least one autofocus coil 914. For instance, the autofocus coils 914 may each define a central space that is encircled by the respective autofocus coil 914. The position sensor magnets 912 may be disposed within the central spaces encircled by the autofocus coils 914. Additionally, or alternatively, the position sensor magnets 912 may be attached to support structures (not shown) that are fixed to the autofocus coils 914. For example, a support structure, to which a position sensor magnet 912 is attached, may be disposed within a central space encircled by an autofocus coil 914 and the support structure may be fixed to the autofocus coil 914.

In some embodiments, the VCM actuator module 900 may include four suspension wires 910. The optical package 918 may be suspended with respect to the base 902 by suspending one or more upper springs 920 on the suspension wires 910. In some embodiments, the VCM actuator module 900 may include one or more lower springs 922. In the optical package 918, an optics component (e.g., a lens stack that includes one or more lens elements, a lens assembly, etc.) may be screwed, mounted or otherwise held in or by an optics holder in some embodiments. Note that upper spring(s) 920 and lower spring(s) 922 may be flexible to allow the optical package 918 a range of motion along the Z (optical) axis for optical focusing, and suspension wires 910 may be flexible to allow a range of motion on the XY plane orthogonal to the optical axis for optical image stabilization. Also note that, while embodiments show the optical package 918 suspended on wires 910, other mechanisms may be used to suspend the optical package 918 in other embodiments.

In various embodiments, the VCM actuator module 900 may be part of a camera module that includes an image sensor 924. The image sensor 924 may be disposed below the optical package 918 such that light rays may pass through one or more lens elements of the optical package 918 (e.g., via an aperture at the top of the optical package 918) and to the image sensor 924.

Multifunction Device Examples

Figure 10:
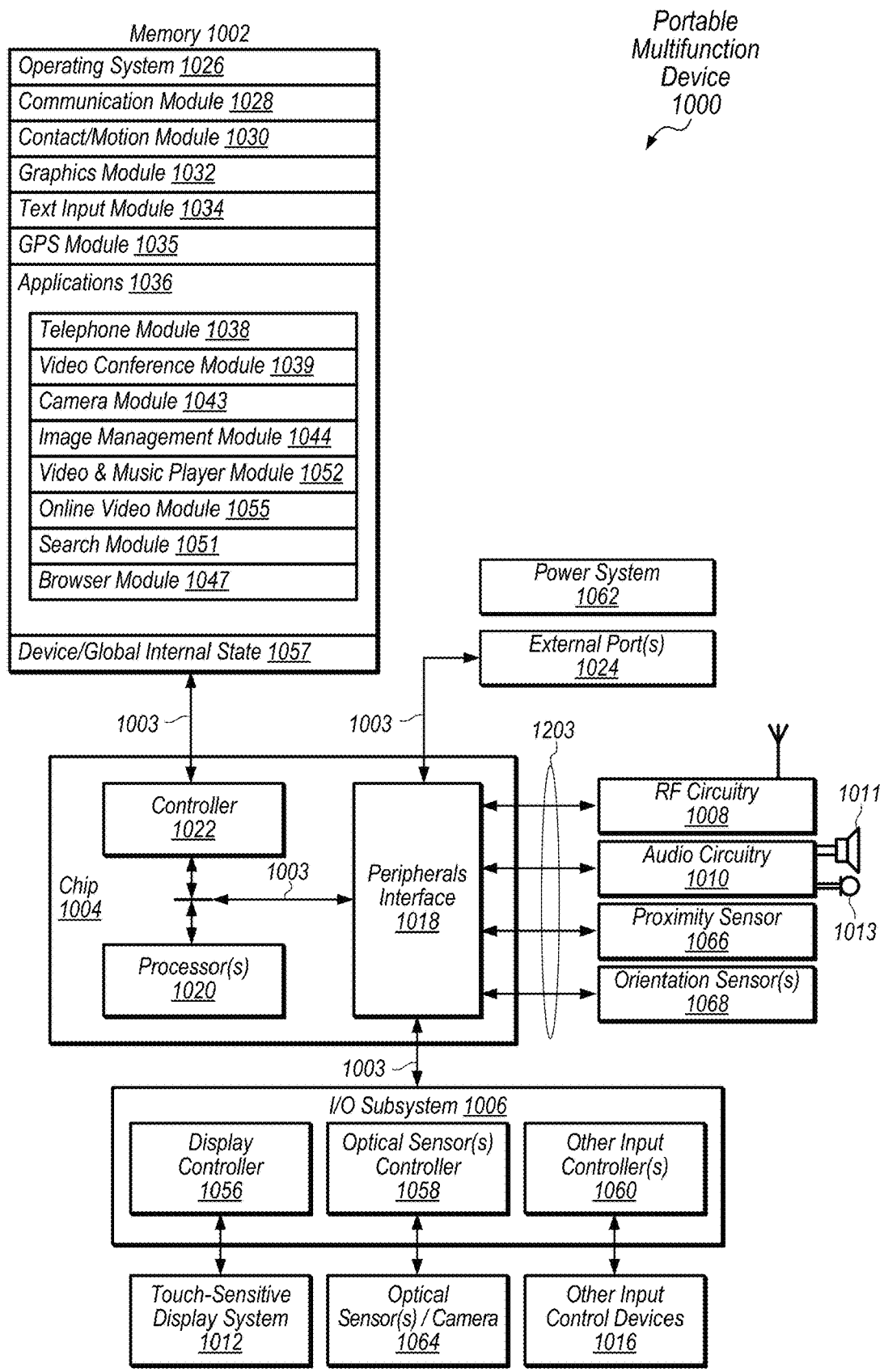
FIG. 10 illustrates a block diagram of a portable multifunction device that may include a camera, in accordance with some embodiments.

FIG. 10 illustrates a block diagram of a portable multifunction device 1000 that may include a camera, in accordance with some embodiments. In some embodiments, the portable multifunction device 1000 may include one or multiple features, components, and/or implement functionality of embodiments described herein with reference to FIGS. 1-9, 11, and 12.

In some embodiments, the device 1000 is a portable communications device, such as a mobile telephone, that also contains other functions, such as PDA, camera, video capture and/or playback, and/or music player functions. Example embodiments of portable multifunction devices include, without limitation, the iPhone®, iPod Touch®, and iPad® devices from Apple Inc. of Cupertino, Calif. Other portable electronic devices, such as laptops, cell phones, smartphones, pad or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera and/or video camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device 1000 typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a streaming video application, and/or a digital video player application.

The various applications that may be executed on the device 1000 may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Device 1000 may include memory 1002 (which may include one or more computer readable storage mediums), memory controller 1022, one or more processing units (CPU's) 1020, peripherals interface 1018, RF circuitry 1008, audio circuitry 1010, speaker 1011, touch-sensitive display system 1012, microphone 1013, input/output (I/O) subsystem 1006, other input control devices 1016, and external port 1024. Device 1000 may include one or more optical sensors or cameras 1064 (e.g., one or more embodiments of the cameras described herein). These components may communicate over one or more communication buses or signal lines 1003.

It should be appreciated that device 1000 is only one example of a portable multifunction device, and that device 1000 may have more or fewer components than shown, may combine two or more components, or may have a different configuration or arrangement of the components. The various components shown in FIG. 10 may be implemented in hardware, software, or a combination of hardware and software, including one or more signal processing and/or application specific integrated circuits.

Memory 1002 may include high-speed random access memory and may also include non-volatile memory, such as one or more magnetic disk storage devices, flash memory devices, or other non-volatile solid-state memory devices. Access to memory 1002 by other components of device 1000, such as CPU 1020 and the peripherals interface 1018, may be controlled by memory controller 1022.

Peripherals interface 1018 can be used to couple input and output peripherals of the device to CPU 1020 and memory 1002. The one or more processors 1020 run or execute various software programs and/or sets of instructions stored in memory 1002 to perform various functions for device 1000 and to process data.

In some embodiments, peripherals interface 1018, CPU 1020, and memory controller 1022 may be implemented on a single chip, such as chip 1004. In some other embodiments, they may be implemented on separate chips.

RF (radio frequency) circuitry 1008 receives and sends RF signals, also called electromagnetic signals. RF circuitry 1008 converts electrical signals to/from electromagnetic signals and communicates with communications networks and other communications devices via the electromagnetic signals. RF circuitry 1008 may include well-known circuitry for performing these functions, including but not limited to an antenna system, an RF transceiver, one or more amplifiers, a tuner, one or more oscillators, a digital signal processor, a coder/decoder (codec) chipset, a subscriber identity module (SIM) card, memory, and so forth. RF circuitry 1008 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1010, speaker 1011, and microphone 1013 provide an audio interface between a user and device 1000. Audio circuitry 1010 receives audio data from peripherals interface 1018, converts the audio data to an electrical signal, and transmits the electrical signal to speaker 1011. Speaker 1011 converts the electrical signal to audible sound waves. Audio circuitry 1010 also receives electrical signals converted by microphone 1013 from sound waves. Audio circuitry 1010 converts the electrical signal to audio data and transmits the audio data to peripherals interface 1018 for processing. Audio data may be retrieved from and/or transmitted to memory 1002 and/or RF circuitry 1008 by peripherals interface 1018. In some embodiments, audio circuitry 1010 also includes a headset jack. The headset jack provides an interface between audio circuitry 1010 and removable audio input/output peripherals, such as output-only headphones or a headset with both output (e.g., a headphone for one or both ears) and input (e.g., a microphone).

I/O subsystem 1006 couples input/output peripherals on device 1000, such as touch screen 1012 and other input control devices 1016, to peripherals interface 1018. I/O subsystem 1006 may include display controller 1056 and one or more input controllers 1060 for other input control devices 1016. The one or more input controllers 1060 receive/send electrical signals from/to other input control devices 1016. The other input control devices 1016 may include physical buttons (e.g., push buttons, rocker buttons, etc.), dials, slider switches, joysticks, click wheels, and so forth. In some alternative embodiments, input controller(s) 1060 may be coupled to any (or none) of the following: a keyboard, infrared port, USB port, and a pointer device such as a mouse. The one or more buttons may include an up/down button for volume control of speaker 1011 and/or microphone 1013. The one or more buttons may include a push button.

Touch-sensitive display 1012 provides an input interface and an output interface between the device and a user. Display controller 1056 receives and/or sends electrical signals from/to touch screen 1012. Touch screen 1012 displays visual output to the user. The visual output may include graphics, text, icons, video, and any combination thereof (collectively termed "graphics"). In some embodiments, some or all of the visual output may correspond to user-interface objects.

Touch screen 1012 has a touch-sensitive surface, sensor or set of sensors that accepts input from the user based on haptic and/or tactile contact. Touch screen 1012 and display controller 1056 (along with any associated modules and/or sets of instructions in memory 1002) detect contact (and any movement or breaking of the contact) on touch screen 1012 and converts the detected contact into interaction with user-interface objects (e.g., one or more soft keys, icons, web pages or images) that are displayed on touch screen 1012. In an example embodiment, a point of contact between touch screen 1012 and the user corresponds to a finger of the user.

Touch screen 1012 may use LCD (liquid crystal display) technology, LPD (light emitting polymer display) technology, or LED (light emitting diode) technology, although other display technologies may be used in other embodiments. Touch screen 1012 and display controller 1056 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1012. In an example embodiment, projected mutual capacitance sensing technology is used, such as that found in the iPhone®, iPod Touch®, and iPad® from Apple Inc. of Cupertino, Calif.

Touch screen 1012 may have a video resolution in excess of 100 dpi. In some embodiments, the touch screen has a video resolution of approximately 160 dpi. The user may make contact with touch screen 1012 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 1012, device 1000 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1012 or an extension of the touch-sensitive surface formed by the touch screen.

Device 1000 also includes power system 1062 for powering the various components. Power system 1062 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1000 may also include one or more optical sensors or cameras 1064. FIG. 10 shows an optical sensor coupled to optical sensor controller 1058 in I/O subsystem 1006. Optical sensor 1064 may, for example, include charge-coupled device (CCD) or complementary metal-oxide semiconductor (CMOS) phototransistors or photosensors. Optical sensor 1064 receives light from the environment, projected through one or more lenses, and converts the light to data representing an image. In conjunction with imaging module 1043 (also called a camera module), optical sensor 1064 may capture still images and/or video sequences. In some embodiments, at least one optical sensor may be located on the back of device 1000, opposite touch screen display 1012 on the front of the device. In some embodiments, the touch screen display may be used as a viewfinder for still and/or video image acquisition. In some embodiments, at least one optical sensor may instead or also be located on the front of the device.

Device 1000 may also include one or more proximity sensors 1066. FIG. 10 shows proximity sensor 1066 coupled to peripherals interface 1018. Alternatively, proximity sensor 1066 may be coupled to input controller 1060 in I/O subsystem 1006. In some embodiments, the proximity sensor turns off and disables touch screen 1012 when the multifunction device is placed near the user's ear (e.g., when the user is making a phone call).

Device 1000 may also include one or more orientation sensors 1068. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1000. In some embodiments, the one or more orientation sensors include any combination of orientation/rotation sensors. FIG. 10 shows the one or more orientation sensors 1068 coupled to peripherals interface 1018. Alternatively, the one or more orientation sensors 1068 may be coupled to an input controller 1060 in I/O subsystem 1006. In some embodiments, information is displayed on the touch screen display in a portrait view or a landscape view based on an analysis of data received from the one or more orientation sensors.

In some embodiments, device 1000 may also include one or more other sensors (not shown) including but not limited to ambient light sensors and motion detectors. These sensors may be coupled to peripherals interface 1018 or, alternatively, may be coupled to an input controller 1060 in I/O subsystem 1006. For example, in some embodiments, device 1000 may include at least one forward-facing (away from the user) and at least one backward-facing (towards the user) light sensors that may be used to collect ambient lighting metrics from the environment of the device 1000 for use in video and image capture, processing, and display applications.

In some embodiments, the software components stored in memory 1002 include operating system 1026, communication module 1028, contact/motion module (or set of instructions) 1030, graphics module 1032, text input module 1034, Global Positioning System (GPS) module 1035, and applications 1036. Furthermore, in some embodiments memory 1002 stores device/global internal state 1057. Device/global internal state 1057 includes one or more of: active application state, indicating which applications, if any, are currently active; display state, indicating what applications, views or other information occupy various regions of touch screen display 1012; sensor state, including information obtained from the device's various sensors and input control devices 1016; and location information concerning the device's location and/or attitude.

Operating system 1026 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1028 facilitates communication with other devices over one or more external ports 1024 and also includes various software components for handling data received by RF circuitry 1008 and/or external port 1024. External port 1024 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 1030 may detect contact with touch screen 1012 (in conjunction with display controller 1056) and other touch sensitive devices (e.g., a touchpad or physical click wheel). Contact/motion module 1030 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1030 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multi-touch"/multiple finger contacts). In some embodiments, contact/motion module 1030 and display controller 1056 detect contact on a touchpad.

Contact/motion module 1030 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1032 includes various software components for rendering and displaying graphics on touch screen 1012 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1032 stores data representing graphics to be used. Each graphic may be assigned a corresponding code. Graphics module 1032 receives, from applications etc., one or more codes specifying graphics to be displayed along with, if necessary, coordinate data and other graphic property data, and then generates screen image data to output to display controller 1056.

Text input module 1034, which may be a component of graphics module 1032, provides soft keyboards for entering text in various applications that need text input.

GPS module 1035 determines the location of the device and provides this information for use in various applications (e.g., to telephone module 1038 for use in location-based dialing, to camera module 1043 as picture/video metadata, and to applications that provide location-based services such as map/navigation applications).

Applications 1036 may include one or more of, but are not limited to, the following modules (or sets of instructions), or a subset or superset thereof:
  telephone module 1038;
  video conferencing module 1039;
  camera module 1043 for still and/or video imaging;
  image management module 1044;
  browser module 1047;
  search module 1051;
  video and music player module 1052, which may be made up of a video player module and a music player module; and/or
  online video module 1055.
  one or more other modules not shown, such as a gaming module.

Examples of other applications 1036 that may be stored in memory 1002 include but are not limited to other word processing applications, other image editing applications, drawing applications, presentation applications, communication/social media applications, map applications, JAVA-enabled applications, encryption, digital rights management, voice recognition, and voice replication.

In conjunction with RF circuitry 1008, audio circuitry 1010, speaker 1011, microphone 1013, touch screen 1012, display controller 1056, contact module 1030, graphics module 1032, and text input module 1034, telephone module 1038 may be used to enter a sequence of characters corresponding to a telephone number, access one or more telephone numbers in an address book, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1008, audio circuitry 1010, speaker 1011, microphone 1013, touch screen 1012, display controller 1056, optical sensor 1064, optical sensor controller 1058, contact/motion module 1030, graphics module 1032, text input module 1034, and telephone module 1038, videoconferencing module 1039 includes executable instructions to initiate, conduct, and terminate a video conference between a user and one or more other participants in accordance with user instructions.

In conjunction with touch screen 1012, display controller 1056, optical sensor(s) 1064, optical sensor controller 1058, contact/motion module 1030, graphics module 1032, and image management module 1044, camera module 1043 includes executable instructions to capture still images or video (including a video stream) and store them into memory 1002, modify characteristics of a still image or video, or delete a still image or video from memory 1002.

In conjunction with touch screen 1012, display controller 1056, contact/motion module 1030, graphics module 1032, text input module 1034, and camera module 1043, image management module 1044 includes executable instructions to arrange, modify (e.g., edit), or otherwise manipulate, label, delete, present (e.g., in a digital slide show or album), and store still and/or video images.

In conjunction with RF circuitry 1008, touch screen 1012, display system controller 1056, contact/motion module 1030, graphics module 1032, and text input module 1034, browser module 1047 includes executable instructions to browse the Internet in accordance with user instructions, including searching, linking to, receiving, and displaying web pages or portions thereof, as well as attachments and other files linked to web pages.

In conjunction with touch screen 1012, display system controller 1056, contact/motion module 1030, graphics module 1032, and text input module 1034, search module 1051 includes executable instructions to search for text, music, sound, image, video, and/or other files in memory 1002 that match one or more search criteria (e.g., one or more user-specified search terms) in accordance with user instructions.

In conjunction with touch screen 1012, display system controller 1056, contact/motion module 1030, graphics module 1032, audio circuitry 1010, speaker 1011, RF circuitry 1008, and browser module 1047, video and music player module 1052 includes executable instructions that allow the user to download and play back recorded music and other sound files stored in one or more file formats, such as MP3 or AAC files, and executable instructions to display, present or otherwise play back videos (e.g., on touch screen 1012 or on an external, connected display via external port 1024). In some embodiments, device 1000 may include the functionality of an MP3 player, such as an iPod (trademark of Apple Inc.).

In conjunction with touch screen 1012, display system controller 1056, contact/motion module 1030, graphics module 1032, audio circuitry 1010, speaker 1011, RF circuitry 1008, text input module 1034, and browser module 1047, online video module 1055 includes instructions that allow the user to access, browse, receive (e.g., by streaming and/or download), play back (e.g., on the touch screen or on an external, connected display via external port 1024), and otherwise manage online videos in one or more video formats, such as the H.264/AVC format or the H.265/HEVC format.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1002 may store a subset of the modules and data structures identified above. Furthermore, memory 1002 may store additional modules and data structures not described above.

In some embodiments, device 1000 is a device where operation of a predefined set of functions on the device is performed exclusively through a touch screen and/or a touchpad. By using a touch screen and/or a touchpad as the primary input control device for operation of device 1000, the number of physical input control devices (such as push buttons, dials, and the like) on device 1000 may be reduced.

The predefined set of functions that may be performed exclusively through a touch screen and/or a touchpad include navigation between user interfaces. In some embodiments, the touchpad, when touched by the user, navigates device 1000 to a main, home, or root menu from any user interface that may be displayed on device 1000. In such embodiments, the touchpad may be referred to as a "menu button." In some other embodiments, the menu button may be a physical push button or other physical input control device instead of a touchpad.

Figure 11:
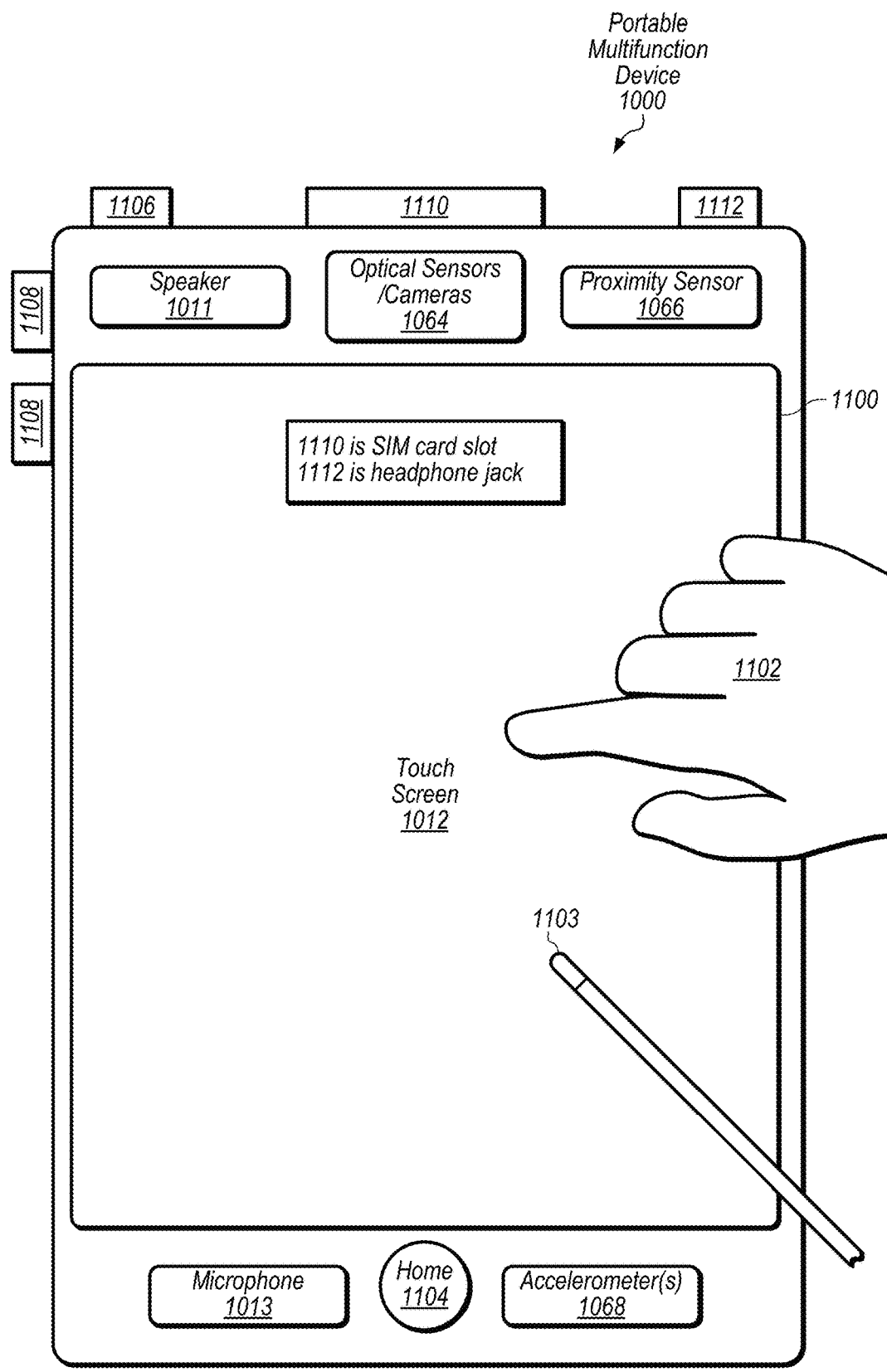
FIG. 11 depicts a portable multifunction device that may include a camera, in accordance with some embodiments.

FIG. 11 depicts illustrates an example portable multifunction device 1000 that may include one or more cameras, in accordance with some embodiments. In some embodiments, the portable multifunction device 1000 may include one or multiple features, components, and/or functionality of embodiments described herein with reference to FIGS. 1-12 and 14.

The device 1000 may have a touch screen 1012. The touch screen 1012 may display one or more graphics within user interface (UI) 1100. In this embodiment, as well as others described below, a user may select one or more of the graphics by making a gesture on the graphics, for example, with one or more fingers 1102 (not drawn to scale in the figure) or one or more styluses 1103 (not drawn to scale in the figure).

Device 1000 may also include one or more physical buttons, such as "home" or menu button 1004. As described previously, menu button 1104 may be used to navigate to any application 1036 in a set of applications that may be executed on device 1000. Alternatively, in some embodiments, the menu button 1104 is implemented as a soft key in a GUI displayed on touch screen 1012.

In one embodiment, device 1000 includes touch screen 1012, menu button 1104, push button 1106 for powering the device on/off and locking the device, volume adjustment button(s) 1108, Subscriber Identity Module (SIM) card slot 1110, head set jack 1112, and docking/charging external port 1024. Push button 1106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1000 also may accept verbal input for activation or deactivation of some functions through microphone 1013.

It should be noted that, although many of the examples herein are given with reference to optical sensor(s)/camera(s) 1064 (on the front of a device), one or more rear-facing cameras or optical sensors that are pointed opposite from the display may be used instead of, or in addition to, an optical sensor(s)/camera(s) 1064 on the front of a device.

Example Computer System

Figure 12:
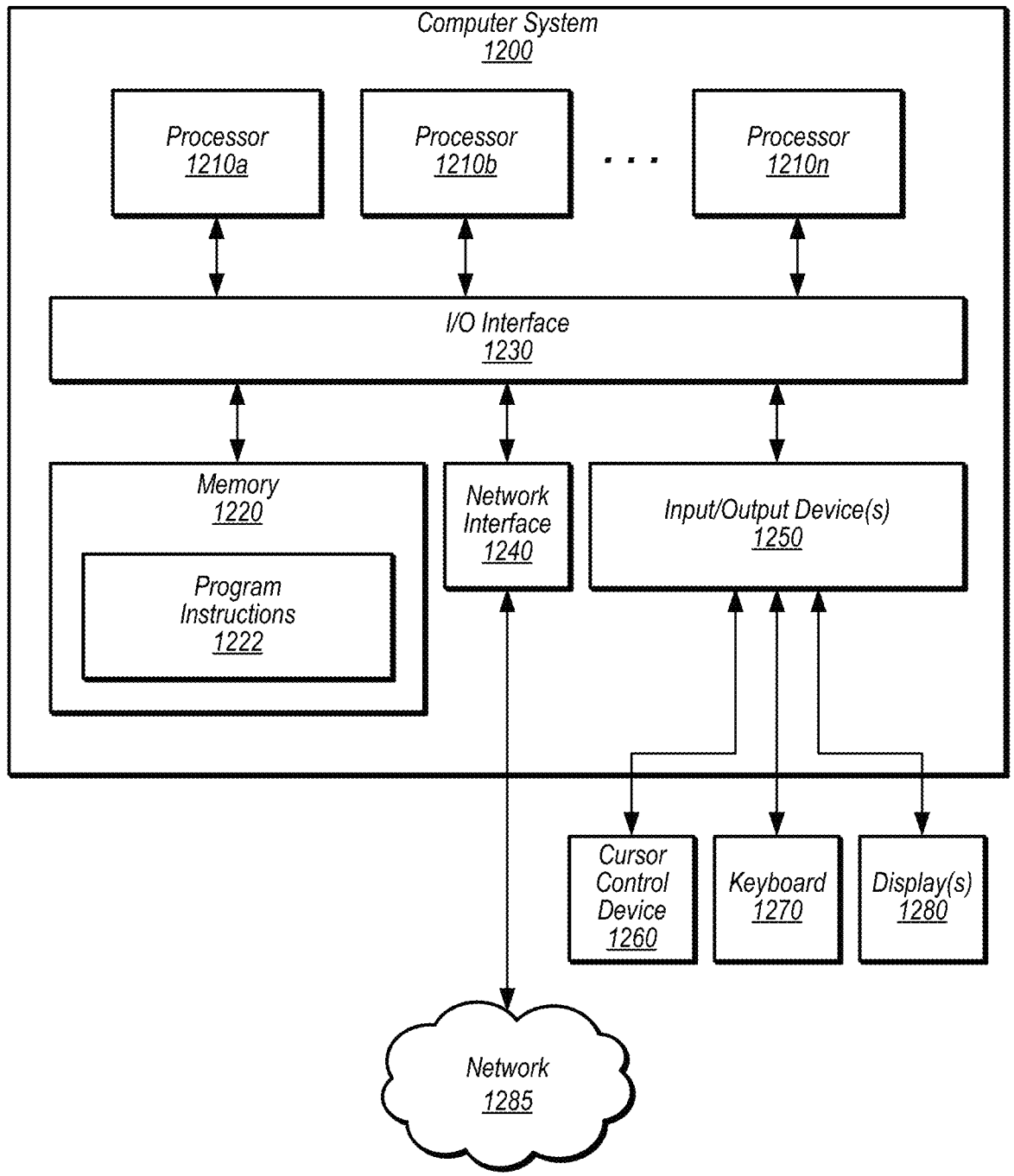
FIG. 12 illustrates an example computer system that may include a camera, in accordance with some embodiments.

FIG. 12 illustrates an example computer system 1200 that may include one or more cameras, in accordance with some embodiments. In some embodiments, the computer system 1200 may include one or multiple features, components, and/or implement functionality of embodiments described herein with reference to FIGS. 1-13.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store program instructions 1222 accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. Additionally, existing camera control data 1232 of memory 1220 may include any of the information or data structures described above. In some embodiments, program instructions and/or data may be received, sent or stored upon different types of computer-accessible media or on similar media separate from system memory 1220 or computer system 1200. While computer system 1200 is described as implementing the functionality of functional blocks of previous figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A method, comprising:
   determining a target effective focal length for capturing an image using a lens system comprising a variable focus device and a lens stack;

changing an optical power of the variable focus device to achieve the target effective focal length; and moving the lens stack while adjusting the optical power of the variable focus device to maintain the target effective focal length and improve image quality for an image capture at the target effective focal length.

2. The method of claim 1, wherein the moving the lens stack while adjusting the optical power of the variable focus device comprises:

compensating, at least in part, for one or more optical aberrations caused by the changing the optical power of the variable focus device to achieve the target effective focal length.

3. The method of claim 1, wherein:

the changing the optical power of the variable focus device comprises:

actuating a first actuator to change a shape of a flexible lens of the variable focus device; and the moving the lens stack comprises:

actuating a second actuator to move one or more lens elements of the lens stack along at least an optical axis of the lens stack.

4. The method of claim 3, further comprising:

detecting, at least partly via a first sensor, position information associated with positioning of the one or more lens elements of the lens stack;

detecting, at least partly via a second sensor, temperature information associated with a lens system comprising the variable focus device and the lens stack; and detecting, at least partly via a third sensor, capacitance information associated with the variable focus device;

wherein at least one of the changing the optical power of the variable focus device or the moving the lens stack is based at least in part on one or more of the position information, the temperature information, or the capacitance information.

5. The method of claim 3, further comprising:

determining whether the image quality for the image capture currently satisfies an image quality threshold;

responsive to determining that the image quality does not currently satisfy the image quality threshold:

continuing the moving the lens stack while adjusting the optical power of the variable focus device to maintain the target effective focal length and improve the image quality for a subsequent image capture at the target effective focal length; and responsive to determining that the image quality currently satisfies the image quality threshold:

performing the subsequent image capture, wherein the performing comprises capturing, at least partly via an image sensor, an image at the target effective focal length and at the image quality that currently satisfies the image quality threshold.

6. A camera system, comprising:

a lens system, comprising:

a variable focus device; and a lens stack; and a controller to:

determine a target effective focal length for capturing an image using the lens system;

cause the camera system to change an optical power of the variable focus device to achieve the target effective focal length; and cause the camera system to move the lens stack while adjusting the optical power of the variable focus device to maintain the target effective focal length and improve image quality for an image capture at the target effective focal length.

7. The camera system of claim 6, wherein the controller is configured to cause the camera system to move the lens stack while adjusting the optical power of the variable focus device to compensate, at least in part, for one or more optical aberrations caused by changing the optical power of the variable focus device to achieve the target effective focal length.

8. The camera system of claim 6, wherein:

to cause the camera system to change the optical power of the variable focus device, the controller is configured to:

actuate a first actuator to change a shape of a flexible lens of the variable focus device; and to cause the camera system to move the lens stack, the controller is configured to:

actuate a second actuator to move one or more lens elements of the lens stack along at least an optical axis of the camera system.

9. The camera system of claim 8, wherein the second actuator is a voice coil motor (VCM) actuator that includes one or more magnets and one or more coils.

10. The camera system of claim 8, wherein the variable focus device comprises:

the flexible lens; and wherein the first actuator is configured to change, at least partly responsive to application of a voltage to the first actuator, the shape of the flexible lens to vary the optical power of the variable focus device.

11. The camera system of claim 10, wherein the variable focus device is a first solid-state microelectromechanical system (MEMS) device that includes a first flexible lens disposed along the optical axis.

12. The camera system of claim 11, further comprising:

a second solid-state microelectromechanical system (MEMS) device that includes a second flexible lens disposed along the optical axis.

13. The camera system of claim 6, further comprising:

an image sensor to a first side of the lens stack;

wherein the variable focus device is to a second side of the lens stack that is opposite the first side.

14. The camera system of claim 6, further comprising:

an image sensor;

wherein the variable focus device is located between the image sensor and the lens stack.

15. A device, comprising:

a camera, comprising:

a lens system, comprising:

a variable focus device; and a lens stack;

one or more processors; and memory storing program instructions executable by the one or more processors to:

determine a target effective focal length for capturing an image using the lens system;

cause the camera to change an optical power of the variable focus device to achieve the target effective focal length; and cause the camera to move the lens stack while adjusting the optical power of the variable focus device to maintain the target effective focal length and improve image quality for an image capture at the target effective focal length.

16. The device of claim 15, wherein the one or more processors cause the camera to move the lens stack while adjusting the optical power of the variable focus device to compensate, at least in part, for one or more optical aberrations caused by changing the optical power of the variable focus device to achieve the target effective focal length.

17. The device of claim 15, wherein:
- to cause the camera to change the optical power of the variable focus device, the one or more processors cause actuation of a first actuator to change a shape of a flexible lens of the variable focus device; and
- to cause the camera to move the lens stack, the one or more processors cause actuation of a second actuator to move one or more lens elements of the lens stack along at least an optical axis of the camera.

18. The device of claim 17, wherein the second actuator is a voice coil motor (VCM) actuator that includes one or more magnets and one or more coils.

19. The device of claim 17, wherein the variable focus device comprises:
- the flexible lens; and
- wherein the first actuator is configured to change, at least partly responsive to application of a voltage to the first actuator, the shape of the flexible lens to vary the optical power of the variable focus device.

20. The device of claim 19, wherein the variable focus device is a solid-state microelectromechanical system (MEMS) device that includes the flexible lens disposed along the optical axis.

* * * * *